United States Patent
Sato et al.

(10) Patent No.: US 12,180,430 B2
(45) Date of Patent: Dec. 31, 2024

(54) CONTROL DEVICE AND CONTROL METHOD

(71) Applicant: Sekisui Chemical Co., Ltd., Osaka (JP)

(72) Inventors: Kanetomo Sato, Tsukuba (JP); Kazuto Natsuyama, Tsukuba (JP); Kokoro Hamachi, Tsukuba (JP)

(73) Assignee: Sekisui Chemical Co., Ltd., Osaka (JP)

( * ) Notice: Subject to any disclaimer, the term of this patent is extended or adjusted under 35 U.S.C. 154(b) by 962 days.

(21) Appl. No.: 17/251,437

(22) PCT Filed: Jun. 24, 2019

(86) PCT No.: PCT/JP2019/024881
§ 371 (c)(1),
(2) Date: Dec. 11, 2020

(87) PCT Pub. No.: WO2020/021930
PCT Pub. Date: Jan. 30, 2020

(65) Prior Publication Data
US 2021/0264269 A1  Aug. 26, 2021

(30) Foreign Application Priority Data
Jul. 25, 2018 (JP) .................. 2018-139784

(51) Int. Cl.
*C10J 3/72* (2006.01)
*F23G 5/50* (2006.01)
(Continued)

(52) U.S. Cl.
CPC ............... *C10J 3/723* (2013.01); *F23G 5/50* (2013.01); *G06F 18/217* (2023.01); *G06N 3/08* (2013.01)

(58) Field of Classification Search
CPC ............ G06F 18/217; F23G 5/50; G06N 3/08
See application file for complete search history.

(56) References Cited

U.S. PATENT DOCUMENTS

| | | | |
|---|---|---|---|
| 8,163,809 B2 * | 4/2012 | Chaubey | F25J 3/0261 518/700 |
| 11,028,449 B2 * | 6/2021 | Knight | G16B 10/00 |

(Continued)

FOREIGN PATENT DOCUMENTS

| | | |
|---|---|---|
| DE | 102011075337 A1 | 11/2012 |
| EP | 3470497 A1 | 4/2019 |

(Continued)

OTHER PUBLICATIONS

English Translation of International Search Report for PCT Application No. PCT/JP2019/024881 mailed Sep. 10, 2019, 4 pages.
(Continued)

*Primary Examiner* — Kyle R Stork
(74) *Attorney, Agent, or Firm* — Bret E. Field; Bozicevic, Field & Francis LLP

(57) ABSTRACT

The object is to provide a control device, an operation control device, a server, a management server, a recording medium, a neural network system model, a control method and an operation control method that enable reuse of combustible waste as industrial raw materials with high efficiency.
A control device comprises a gas information acquisition unit that acquires gas information on gas converted by a gasifying furnace for converting collected waste to gas; a control information acquisition unit that acquires control information controlling the gas purification device for purifying gas converted by the gasifying furnace; a feature information acquisition unit that acquires feature information including information on purified gas purified by the gas purification device; and a creation unit that creates a learning model by machine learning based on the gas information, the control information and the feature information.

3 Claims, 14 Drawing Sheets

(51) Int. Cl.
*G06F 18/21* (2023.01)
*G06N 3/08* (2023.01)

(56) References Cited

U.S. PATENT DOCUMENTS

| | | | |
|---|---|---|---|
| 2018/0075371 A1* | 3/2018 | Lobachev | G05B 13/0265 |
| 2018/0349757 A1 | 12/2018 | Ando | |
| 2019/0202763 A1 | 7/2019 | Ishii et al. | |
| 2019/0256874 A1 | 8/2019 | Fujimori et al. | |

FOREIGN PATENT DOCUMENTS

| | | |
|---|---|---|
| EP | 3476920 A1 | 5/2019 |
| JP | H11-353295 A | 12/1999 |
| JP | 2005-265918 A | 9/2005 |
| JP | 2011-056392 A | 3/2011 |
| JP | 2016-059296 A | 4/2016 |
| JP | 6097895 B1 | 3/2017 |
| JP | 2018-092511 A | 6/2018 |
| WO | WO2017159614 A1 | 9/2017 |
| WO | WO2017221987 A1 | 12/2017 |

OTHER PUBLICATIONS

Extended European Search Report for European Application No. 19839911.5 mailed Mar. 7, 2022, 7 pages.

* cited by examiner

FIG.6

ACTION $a_t$

| CYCLE TIME | EXTENDING | SHORTENING | MAINTAINING |
|---|---|---|---|
| GAS TEMPERATURE | RAISING | REDUCING | MAINTAINING |
| AMOUNT OF GAS | INCREASING | REDUCING | MAINTAINING |
| GAS HUMIDITY | RAISING | REDUCING | MAINTAINING |

FIG. 12

| PLANT LIST SCREEN | | | |
|---|---|---|---|
| PLANT ID | DEGRADATION LEVEL OF ADSORBERS | ALERT | MICROORGANISMS ACTIVITY DEGREE |
| P0001 | ADSORBERS 1 / ADSORBERS 2 | ☐ ☐ | OK NG |
| P0002 | ADSORBERS 1 / ADSORBERS 2 | ☐ ☐ | OK NG |
| ... | ... | ... | ... |

211 PLANT LIST SCREEN
212 PLANT ID
213 REPLACEMENT
214 ALERT
215 MICROORGANISMS ACTIVITY DEGREE

CONTROL DEVICE AND CONTROL METHOD

CROSS-REFERENCE TO RELATED APPLICATIONS

This application is the national phase under 35 U.S.C. § 371 of PCT International Application No. PCT/JP2019/024881 which has an International filing date of Jun. 24, 2019 and designated the United States of America.

FIELD

The present invention relates to a control device, an operation control device, a server, a management server, a recording medium, a neural network system, a control method and an operation control method.

BACKGROUND

Though the amount of energy equivalent to combustible waste discharged in Japan is greater than fossil resources used for producing plastic material, a lot of combustible waste are subjected to incineration disposal or landfill disposal.

Japanese Patent Application Laid-Open Publication No. 2011-56392 discloses a waste disposal facility in which a magnetic material is magnetically sorted from incineration ash discharged from a waste incinerator, and the sorted magnetic material is subjected to reduction metallization treatment, whereby the iron oxide which has been conventionally buried in the land is subjected to the reduction treatment to reduce the amount of disposal by landfill.

SUMMARY

In the waste disposal facility disclosed in Japanese Patent Application Laid-Open Publication No. 2011-56392, however, reuse of combustible waste has only partly been executed.

Furthermore, combustible waste is miscellaneous and heterogeneous, and fluctuates widely in component or composition, which makes it difficult to be reused as industrial raw materials.

The present disclosure is made in view of such problems and it is an object of the present invention to provide a control device, an operation control device, a server, a management server, a recording medium, a neural network system, a control method and an operation control method that enable reuse of combustible waste as industrial raw materials with high efficiency.

A control device according to an embodiment of the present disclosure is a control device controlling a gas purification device, and comprises: a gas information acquisition unit that acquires gas information on gas converted by a gasifying furnace for converting collected waste to gas; a control information acquisition unit that acquires control information controlling the gas purification device for purifying gas converted by the gasifying furnace; a feature information acquisition unit that acquires feature information including information on purified gas purified by the gas purification device; and a creation unit that creates a learning model by machine learning based on the gas information, the control information and the feature information.

A control device according to an embodiment of the present disclosure is a control device for controlling a gas purification device, and comprises: a learning model trained based on gas information on gas converted by a gasifying furnace for converting collected waste to gas, control information controlling the gas purification device for purifying gas converted by the gasifying furnace, and feature information including information on purified gas purified by the gas purification device; a gas information acquisition unit that acquires gas information on gas converted by the gasifying furnace; and an output unit that inputs gas information acquired by the gas information acquisition unit to the learning model to output control information for controlling the gas purification device.

A server according to an embodiment of the present disclosure comprises a collection unit that collects, from each of a plurality of waste disposal plants, identification information identifying a plant, gas information on gas converted by a gasifying furnace for converting collected waste to gas, control information controlling the gas purification device for purifying gas converted by the gasifying furnace, and feature information including information on purified gas purified by the gas purification device; and a storage unit that stores the gas information, control information and feature information collected by the collection unit in association with the identification information.

A management server according to an embodiment of the present disclosure comprises a collection unit that collects, from each of a plurality of waste disposal plants, identification information identifying a plant and a degradation level of an adsorber provided in a gas purification device for purifying gas having been converted by a gasifying furnace for converting collected waste to gas, and a storage unit that stores a degradation level collected by the collection unit in association with the identification information.

An operation control device according to an embodiment of the present disclosure is an operation control device for controlling a target gas purification device, and comprises a gas information acquisition unit that acquires gas information on gas converted by a target gasifying furnace for converting collected waste to gas, and a control information output unit that outputs control information for controlling the target gas purification device that is obtained by inputting gas information acquired by the gas information acquisition unit to a learning model trained based on gas information on gas converted by a gasifying furnace, control information controlling a gas purification device for purifying gas converted by the gasifying furnace and feature information including information on purified gas purified by the gas purification device.

A computer readable non transitory recording medium recording a computer program according to an embodiment of the present disclosure, the computer program causes a computer to execute the processing of acquiring gas information on gas converted by a gasifying furnace for converting collected waste to gas; acquiring control information controlling a gas purification device for purifying gas converted by the gasifying furnace; acquiring feature information including information on purified gas purified by the gas purification device; and creating a learning model by machine learning based on the gas information, the control information and the feature information.

A computer readable non-transitory recording medium recording a computer program according to an embodiment of the present disclosure, the computer program causes a computer to execute the following processing of acquiring gas information on gas converted by a gasifying furnace for converting collected waste to gas; and outputting control information controlling a gas purification device by inputting acquired gas information to a learning model trained based on gas information on gas converted by the gasifying furnace, control information controlling the gas purification device for purifying gas converted by the gasifying furnace and feature information including information on purified gas purified by the gas purification device.

A neural network system according to an embodiment of the present disclosure is trained based on gas information on gas converted by a gasifying furnace for converting collected waste to gas, control information controlling a gas purification device for purifying gas converted by the gasifying furnace, and feature information including information on purified gas purified by the gas purification device.

A control method according to an embodiment of the present disclosure is a control method for controlling a gas purification device, and comprises: acquiring gas information on gas converted by a gasifying furnace for converting collected waste to gas; acquiring control information controlling the gas purification device for purifying gas converted by the gasifying furnace; acquiring feature information including information on purified gas purified by the gas purification device; and creating a learning model by machine learning based on the gas information, the control information and the feature information.

A control method according to an embodiment of the present disclosure is a control method for controlling a gas purification device, and comprises: acquiring gas information on gas converted by a gasifying furnace for converting collected waste to gas; and outputting control information controlling the gas purification device by inputting acquired gas information to a learning model trained based on gas information on gas converted by the gasifying furnace, control information controlling the gas purification device for purifying gas converted by the gasifying furnace and feature information including information on purified gas purified by the gas purification device.

An operation control method according to an embodiment of the present disclosure is an operation control method for controlling a target gas purification device, and comprises: acquiring gas information on gas converted by a target gasifying furnace for converting collected waste to gas; and outputting control information for controlling the target gas purification device that is obtained by inputting acquired gas information to a learning model trained based on gas information on gas converted by a gasifying furnace, control information controlling a gas purification device for purifying gas converted by the gasifying furnace and feature information including information on purified gas purified by the gas purification device.

According to the present disclosure, combustible waste can be reused as industrial raw materials with high efficiency. The above and further objects and features of the invention will more fully be apparent from the following detailed description with accompanying drawings.

BRIEF DESCRIPTION OF THE DRAWINGS

FIG. 6 illustrates one example of an action.

FIG. 12 is a schematic view illustrating one example of a plant list screen displayed by a display device.

An embodiment of the present invention will be described below with reference to the drawings. FIG. 1 is a schematic view illustrating one example of the configuration of an ethanol generation system 100 according to the present embodiment. The ethanol generation system is established in a waste disposal facility, for example, and includes a gasifying furnace 10, a gas purification device 20, an ethanol generation device 30 and a control device 50.

Figure 1:
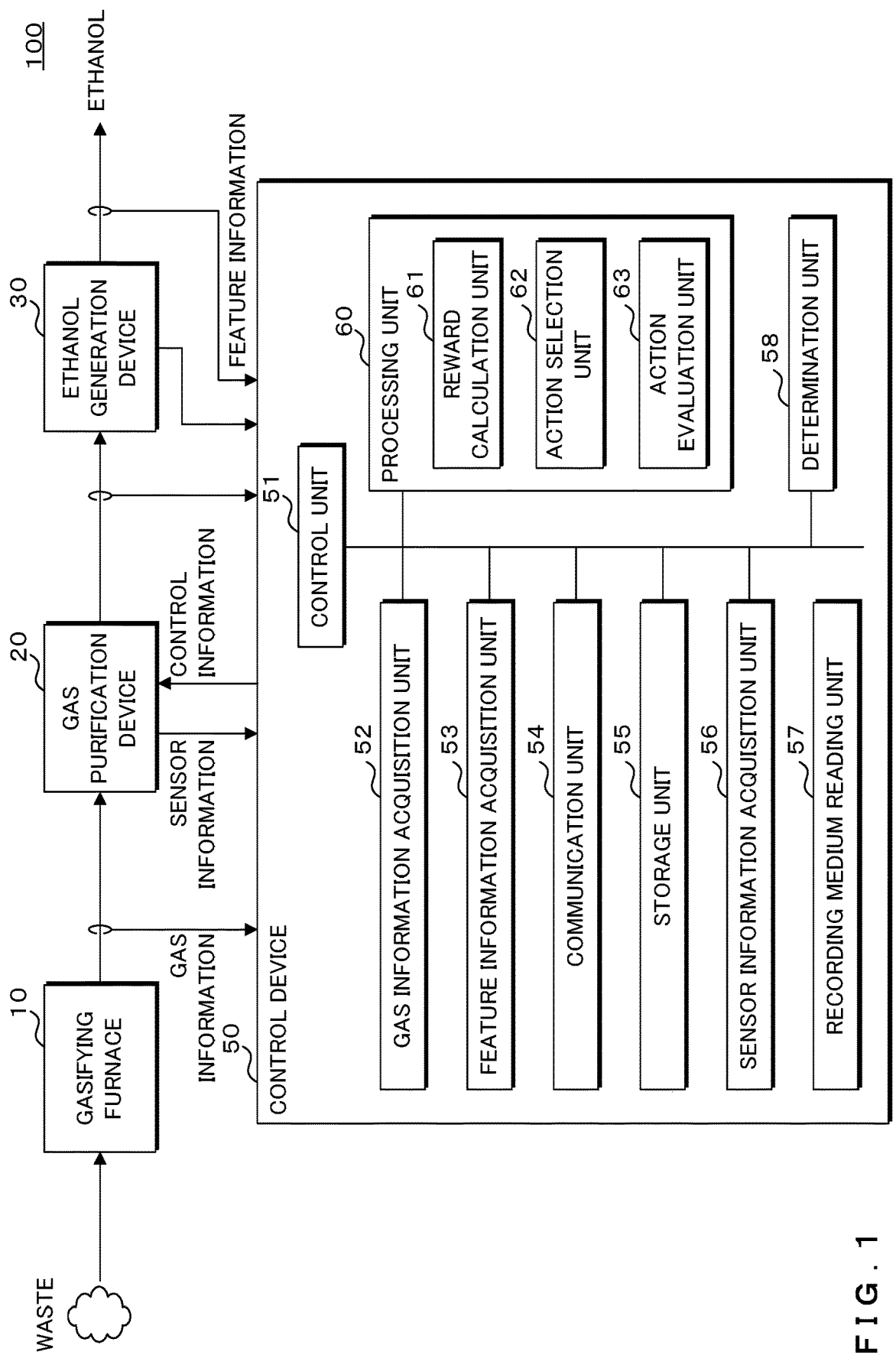
FIG. 1 is a schematic view illustrating one example of the configuration of an ethanol generation system according to an embodiment.

The gasifying furnace 10 is a furnace capable of steaming and baking waste (combustible waste) under low-oxygen conditions to break down the waste into the molecular level (including carbon monoxide gas and hydrogen gas, for example). The gas purification device 20 removes or purifies impurity gas included in the gas converted by the gasifying furnace 10 to thereby extract required gas (carbon monoxide gas and hydrogen gas, for example). The ethanol generation device 30 uses the required gas extracted from the gas purification device 20 to generate ethanol using a catalyst (metal catalyst and microbial catalyst, for example). Ethanol has a $C_2$ structure similar to ethylene that accounts for approximately 60% of petrochemical products and is converted into an ethylene monomer or a butadiene monomer by the existing chemical process, to derive an induced chemical material such as plastic or the like. It is noted that any combustible waste is appropriate as long as it is combustible, and the examples of the combustible waste include, but are not limited to, industrial wastes, general wastes and agricultural wastes. Other than the combustible waste, an organic compound and/or an inorganic compound may be used as an alternative to the waste in the present embodiment. The present invention is applicable as long as the organic compound and/or the inorganic compound can be converted into gas including one or more of $CO$, $CO_2$ and $H_2$ as main components of the gas to be converted.

The control device 50 includes a control unit 51 for controlling the whole device, a gas information acquisition unit 52, a feature information acquisition unit 53, a communication unit 54, a storage unit 55, a sensor information acquisition unit 56, a recording medium reading unit 57, a determination unit 58 and a processing unit 60. The processing unit 60 includes a reward calculation unit 61, an action selection unit 62 and an action evaluation unit 63.

The control unit 51 can be constituted by a CPU, a ROM and a RAM, etc.

The gas information acquisition unit 52 acquires gas information of the gas converted by the gasifying furnace 10. The gas information includes, for example, the concentration of impurity gas (foreign substance) extracted from the gasifying furnace 10. The impurity gas includes gas such as hydrogen cyanide, benzene, toluene, ethylbenzene, xylene, dioxin or the like though the types of the impurity gas are not limited thereto. Note that the concentration of the impurity gas fluctuates depending on the component or composition of miscellaneous waste.

The processing unit 60 has a function as a control information acquisition unit, and acquires control information for controlling the operation of the gas purification device 20. The details of the control information will be described later.

The feature information acquisition unit 53 acquires feature information including information on purified gas purified by the gas purification device 20. The information on the purified gas includes, for example, the purity of carbon monoxide gas and hydrogen gas. The information on the purified gas may also include the purity of carbon dioxide gas, or may include the concentration of the impurity gas that failed to be removed. The feature information further includes various activity degrees of catalysts (well-known catalysts, for example, metal catalyst and microbial catalyst) for generating ethanol from carbon monoxide gas and hydrogen gas as well as the purity and quantity of ethylene generated by the ethanol generation device 30.

The communication unit 54 has a function of communicating with a management server 200 and a learning server 300 via a network 1 to be described later, and can transmit and receive required information. The management server 200 and the learning server 300 will be described later.

The storage unit 55 is constituted by a hard disk, a flash memory or the like and can store information acquired from the outside of the control device 50 and information such as processing results inside the control device 50.

The sensor information acquisition unit 56 acquires sensor information from the gas purification device 20. The details of the sensor information will be described later.

The recording medium reading unit 57 can read from a recording medium (not illustrated) recording a computer program defining the processing to be performed by the control device 50 the computer program recorded in the recording medium.

The determination unit 58 determines the activity degree of microorganisms based on the state of the microorganisms in the case where the microorganisms are used as one example of the catalyst to generate ethanol in the ethanol generation device 30. The activity degree includes, for example, a reaction rate, viability or the like of the microorganisms. The activity degree of the microorganisms can be determined by monitoring in real time the state of the microorganisms from outside of a culture solution layer. Note that the activity degree of the microorganisms may be determined by monitoring the state of the microorganisms off-line. Thus, if the activity degree of microorganisms drops, nutrients can be added to thereby activate the microorganisms again. This makes it possible to maintain the generation speed of ethanol at a high level. Note that if a metal catalyst is used as an example of the catalyst, the determination unit 58 does not need to be provided.

The processing unit 60 can be constituted by a combination of hardware such as a CPU (multi-processor mounted with multiple processor cores, for example), a graphics processing units (GPU), a digital signal processor (DSP), and a field-programmable gate arrays (FPGA), for example. Furthermore, the processing unit 60 may be constituted by a virtual machine, a quantum computer, etc. An agent, which will be described later, is a virtual machine existing in a computer, and the state of the agent is changed by parameters or the like. Moreover, the processing unit 60 may be trained by another computer other than the control device 50.

The processing unit 60 has a function as a creation unit, and can create a learning model by machine learning based on gas information, control information and feature information. Deep learning, reinforcement learning, deep reinforcement learning or the like may be used as the machine learning. If the reinforcement learning is used, for example, a "reward" is calculated based on the feature information when the gas information is assumed as a "state" and the control information is assumed as an "action," so that the Q value or a value of the Q function (action value function) is trained.

That is, the action selection unit 62 has a function as an action output unit, and outputs control information based on the gas information acquired by the gas information acquisition unit 52 and the Q value or the value (action evaluation information) of the Q function of the action evaluation unit 63. The action evaluation unit 63 includes an evaluation value of an action in the reinforcement learning and specifically includes the Q value or a value (action value function) of the Q function. That is, the action selection unit 62 selects and outputs an action from actions that can be taken in the acquired state (gas information) based on the evaluation value of the action in the acquired state.

The reward calculation unit 61 calculates a reward based on the acquired feature information. The calculation of the reward can be performed such that the reward is made positive (rewarded) if the feature information is equal to a required value or is within a required range while the reward is 0 (not rewarded) or is made negative (provided with penalty) if the feature information is not equal to a required value or is not within a required range.

The action selection unit 62 has a function as an update unit, and updates the Q value or a value of the Q function of the action evaluation unit 63 such that the reward calculated by the reward calculation unit 61 is high. Thus, the learning model can be trained so as to output control information that allows the feature information on the output side of the gas purification device 20 to be equal to a required value or to be within a required range even if the concentration of the gas (impurity gas) input to the gas purification device 20 exceeds a threshold due to the wide fluctuation in component or composition of the waste.

By using the trained learning model, the operation of the gas purification device 20 can be optimized to generate desired ethanol even if the component or composition of the waste fluctuates, which allows combustible waste to be reused as industrial raw materials with high efficiency.

The control unit 51 can store the updated Q value or value of the Q function (action evaluation information) of the action evaluation unit 63 in the storage unit 55. By reading out the action evaluation information stored in the storage unit 55, the trained learning model can be recreated.

Figure 2:
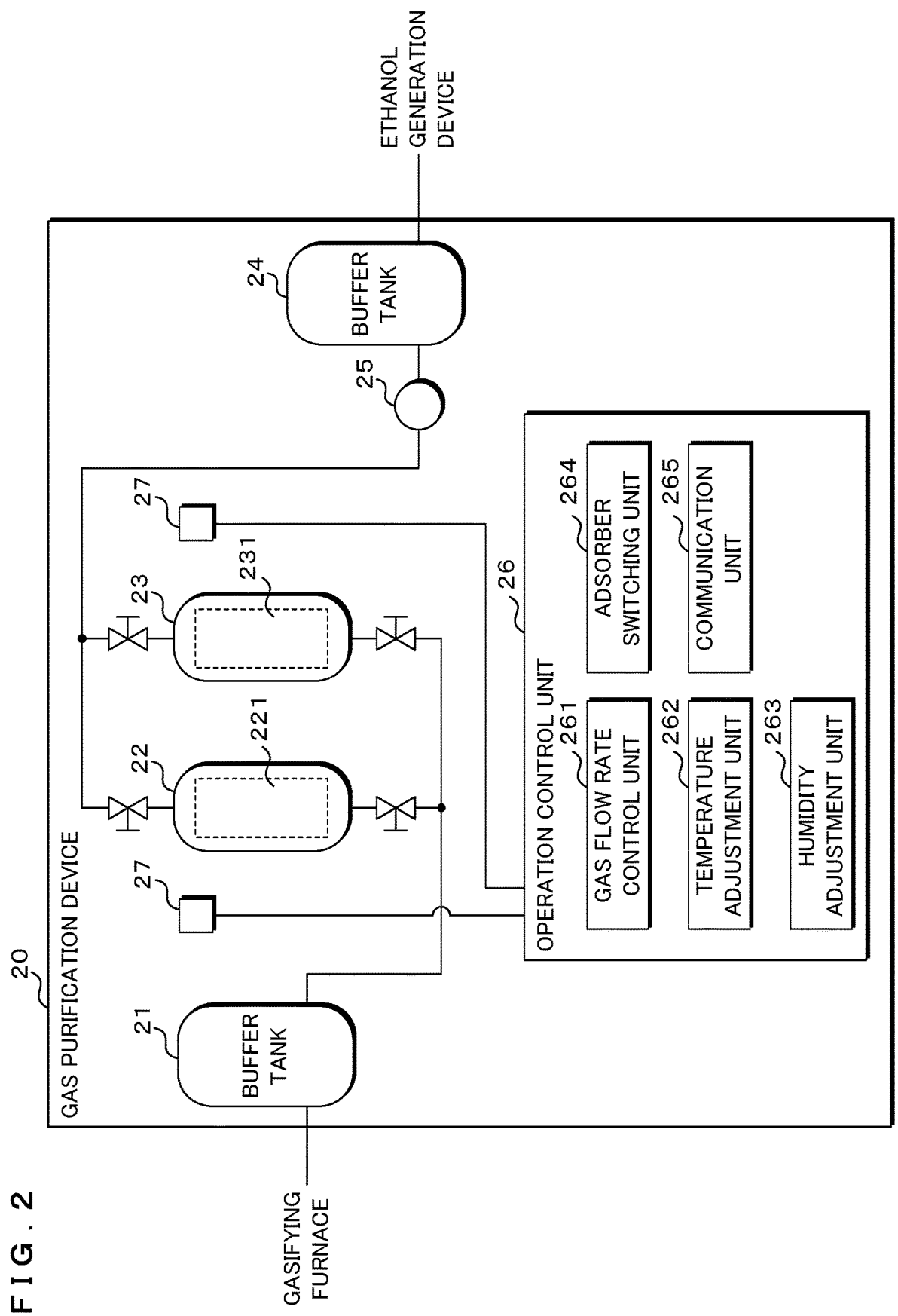
FIG. 2 is a schematic view illustrating one example of the main components of a gas purification device.

FIG. 2 is a schematic view illustrating one example of the main components of the gas purification device 20. The gas purification device 20 has a gas conduit communicating with the output side of the gasifying furnace 10 and the input side of the ethanol generation device 30, and includes, in the middle of the gas conduit, a buffer tank 21, two adsorbers 22 and 23, a compressor 25 and a buffer tank 24 interposed in this order from the gasifying furnace 10 side. The buffer tanks 21 and 24 are for temporarily storing gas. Solenoid valves are provided on the input sides and the output sides of the adsorbers 22 and 23 of the gas conduit.

The adsorber 22 accommodates a gas adsorption member 221 while the adsorber 23 accommodates a gas adsorption member 231. At required positions for the adsorber 22 and the adsorber 23, sensor units 27 are provided. For convenience, the sensor units 27 are provided outside the adsorbers 22 and 23 in FIG. 2, though the locations of the sensor units 27 are not limited to the example in FIG. 2.

The adsorber 22 and the adsorber 23 are alternately used one by one. For example, the adsorber 22 is used during a cycle time while the adsorber 23 is used during the next cycle time instead of the adsorber 22. Similar switching is repeated thereafter. During one cycle time, operation such as a rise or drop of the pressure in the adsorber and operation such as installation or removal, and cleaning of the adsorber (gas adsorption member, for example) or the like is performed.

Figure 3:
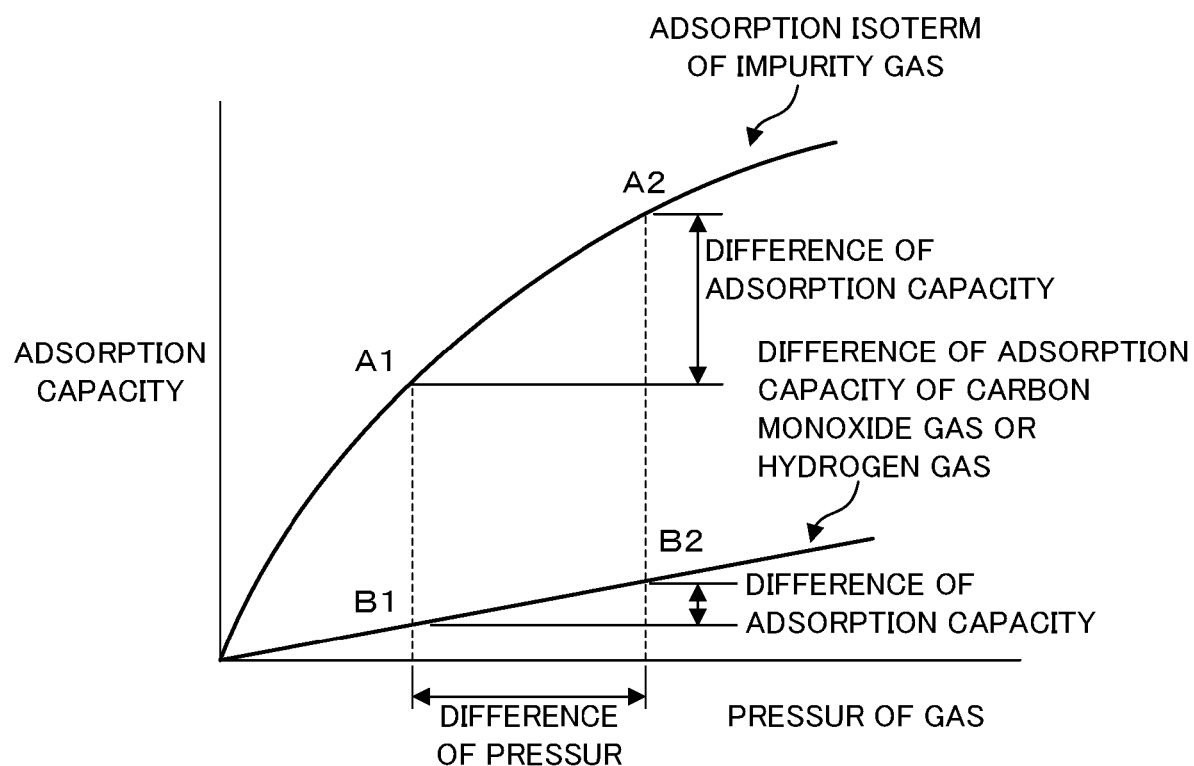
FIG. 3 illustrates a principle of a pressure swing adsorption method.

FIG. 3 illustrates a principle of a pressure swing adsorption method. In the drawing, the vertical axis represents adsorption capacity while the horizontal axis represents the pressure of gas. In FIG. 3, the adsorption isotherm of impurity gas and the adsorption isotherm of carbon monoxide gas or hydrogen gas are schematically shown. The principle of the pressure swing adsorption (PSA) method is as follows. When the pressure within the adsorber is increased or lowered (raised or dropped), the difference of the adsorption capacity of the impurity gas (difference between reference codes A1 and A2) is larger than the difference of the adsorption capacity of carbon monoxide gas or hydrogen gas (difference between reference codes B1 and B2). Thus, a larger amount of the impurity gas is adsorbed to the gas adsorption member and removed compared to the carbon monoxide gas or the hydrogen gas. The carbon monoxide gas or hydrogen gas that is not adsorbed on the gas adsorption member is delivered to the ethanol generation device 30.

An operation control unit 26 includes a gas flow rate control unit 261, a temperature adjustment unit 262, a humidity adjustment unit 263, an adsorber switching unit 264 that switches the operation between the adsorbers 22 and 23, and a communication unit 265. The communication unit 265 has a communication function, and transmits and receives predetermined information to and from the control device 50.

The operation control unit 26 has a function as a use history acquisition unit, and acquires use histories of the adsorbers 22 and 23 (gas adsorption members 221 and 231, for example). The use history includes a cumulative use time, and the number of times for cleaning, for example.

The sensor unit 27 is constituted by multiple sensors of different types and can detect the degradation level of the adsorbers 22 and 23 (gas adsorption members 221 and 231, for example). The degradation level may be determined by, for example, the color of or dirt on the surfaces of the gas adsorption members 221 and 231 after cleaning the gas adsorption members 221 and 231 and by the amount of impurities adsorbed during a predetermined cycle time.

The sensor unit 27 can detect the presence or absence of installation and removal operation of the adsorbers 22 and 23 (gas adsorption members 221 and 231, for example). The installation and removal operation of the adsorbers 22 and 23 can be unintentional installation and removal operation, for example.

The communication unit 265 can transmit to the control device 50 information such as a use history, a degradation level, and the presence or absence of installation and removal operation of the adsorbers 22 and 23.

The gas flow rate control unit 261 controls the flow rate of gas based on the control information output by the control device 50.

The temperature adjustment unit 262 adjusts the temperature of gas based on the control information output by the control device 50.

The humidity adjustment unit 263 adjusts the humidity of gas based on the control information output by the control device 50.

The adsorber switching unit 264 adjusts the cycle time for switching the operation between the adsorbers 22 and 23 based on the control information output by the control device 50.

Next, a learning mode for the processing unit 60 of the control device 50 will be described.

Figure 4:
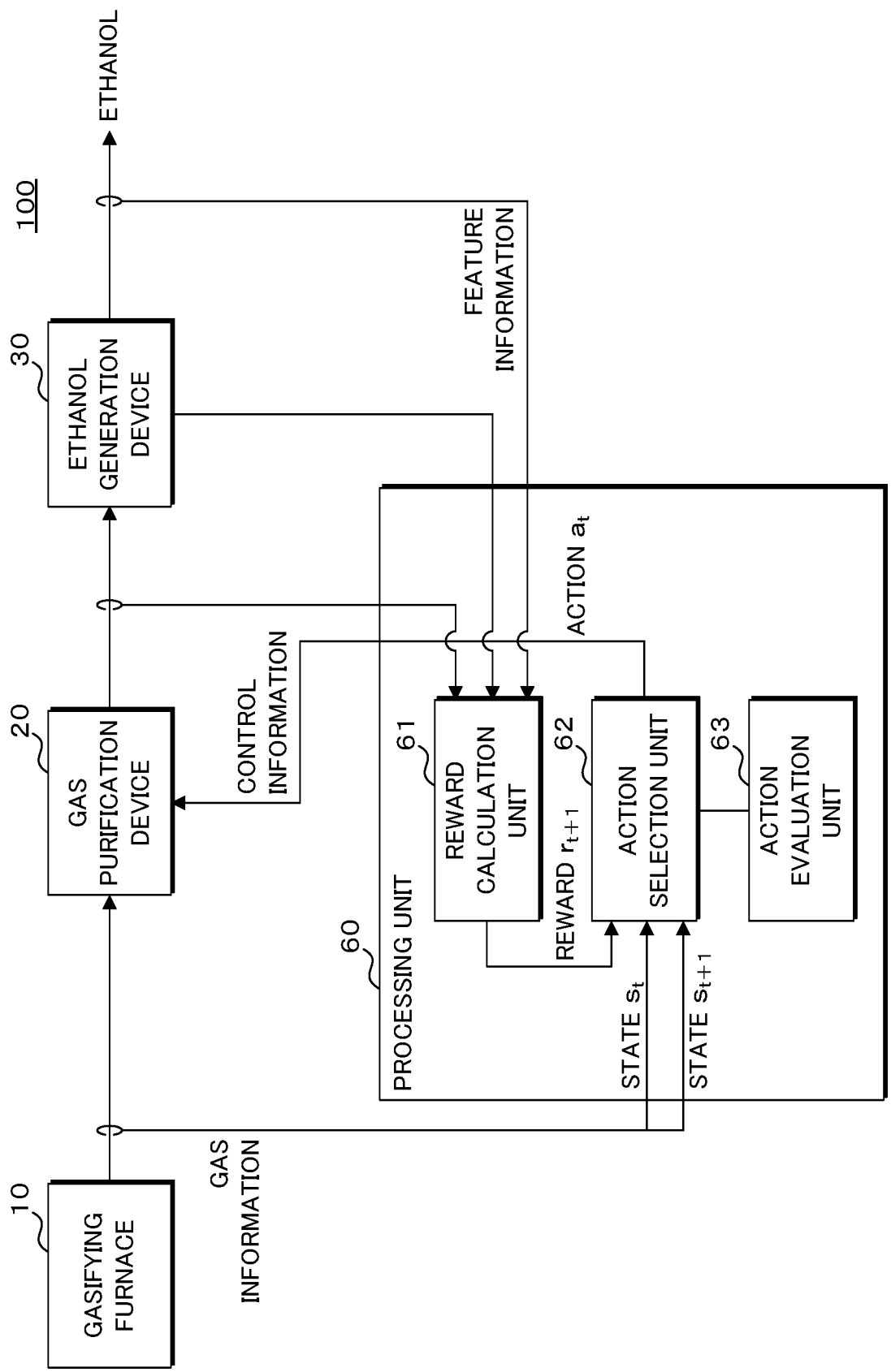
FIG. 4 is a schematic view illustrating one example of reinforcement learning according to the present embodiment.

FIG. 4 is a schematic view illustrating one example of reinforcement learning according to the present embodiment. The reinforcement learning is a machine learning algorithm for obtaining a policy (rule as an indicator for an agent to take an action) that allows an agent under a certain environment to take an action on the environment and earn the maximum reward. In the reinforcement learning, the agent is a learner who takes an action on an environment and is a subject for learning. The environment provides an update of a state and a reward for an action by the agent. The action is a behavior that can be taken by the agent under a certain state in the environment. The state is a situation of the environment held by the environment. The reward is provided to an agent if the agent exerts a desirable result on the environment. The reward may be, for example, a positive value, a negative value or zero. A reward itself is provided if the reward is a positive value, a penalty is provided if the reward is a negative value, and no reward is provided if the reward is zero. In addition, an action evaluation function is a function defining an evaluation value of an action in a certain state and can be shown as a table. In the Q learning, it may be referred to as a Q function, a Q value, an evaluation value or the like. The Q learning is among the most often used methods in the reinforcement learning. The Q learning will be described below, though the reinforcement learning may alternatively employ a method different from the Q learning.

In the present embodiment, the gasifying furnace 10, the gas purification device 20, the ethanol generation device 30 and the reward calculation unit 61 in the processing unit 60 correspond to "environment" while the action selection unit 62 and the action evaluation unit 63 correspond to "agent." The action evaluation unit 63 corresponds to the above-mentioned Q function or Q value, and corresponds to the action evaluation function (action evaluation information).

When first acquiring a state $s_t$, the action selection unit 62 selects an action valued highest (having the largest value of the Q function, for example) among the actions that can be taken at the state $s_t$ based on the action evaluation unit 63 and outputs the action $a_t$ as control information to the gas purification device 20. The gas purification device 20 performs operation control based on the control information.

Next, the action selection unit 62 acquires a state $s_{t+1}$ and acquires a reward $r_{t+1}$ from the reward calculation unit 61. The duration (interval) between the time t when the state $s_t$ is acquired and the time t+1 when the state $s_{t+1}$ is acquired can appropriately be set and may be set to 1 second, 10 seconds, 30 seconds, 1 minute, 2 minutes or the like though not limited thereto.

When the gas purification device 20 performs operation control based on the action $a_t$ (control information), the feature information is changed. The reward calculation unit 61 can calculate a reward $r_{t+1}$ based on the feature information changed by the action $a_t$ (control information). When the action selection unit 62 exerts a desirable effect on the gas purification device 20, a reward with a high value (positive value) is calculated. No reward is calculated when the reward is zero while a penalty is calculated when the reward is a negative value. The reward calculation unit 61 can calculate a reward based on at least one of the purity of the carbon monoxide gas and the hydrogen gas purified by the gas purification device 20, the purity or quantity of the ethanol purified by the ethanol generation device 30 and the activity degree of the catalyst in the ethanol generation device 30. This makes it possible to perform operation control of the gas purification device 20 such that the feature information is equal to a required value or within a required range. Here, a reward may be calculated using the concentration of the impurity gas output by the gas purification device 20. In this case, the higher the concentration of the impurity gas is, the larger the penalty may be.

The action selection unit 62 updates the value of the Q function or the Q value, for example, of the action evaluation unit 63 based on the acquired state $s_{t+1}$ and the reward $r_{t+1}$. More specifically, the action selection unit 62 updates the Q function or the Q value in such a direction as to maximize the reward for the action. This makes it possible to learn an action for which the maximum value is anticipated in a certain state in the environment.

By repeatedly performing the above mentioned processing, the action evaluation unit 63 is repeatedly updated, so that it is possible to learn the action evaluation unit 63 capable of maximizing the reward.

In the Q learning, a table (also referred to as a Q table) having a size of (the number of states s*the number of actions a) can be updated. Alternatively, a method in which the Q function is represented by a neural network may be employed if the number of states is high as in the present embodiment.

Figure 5:
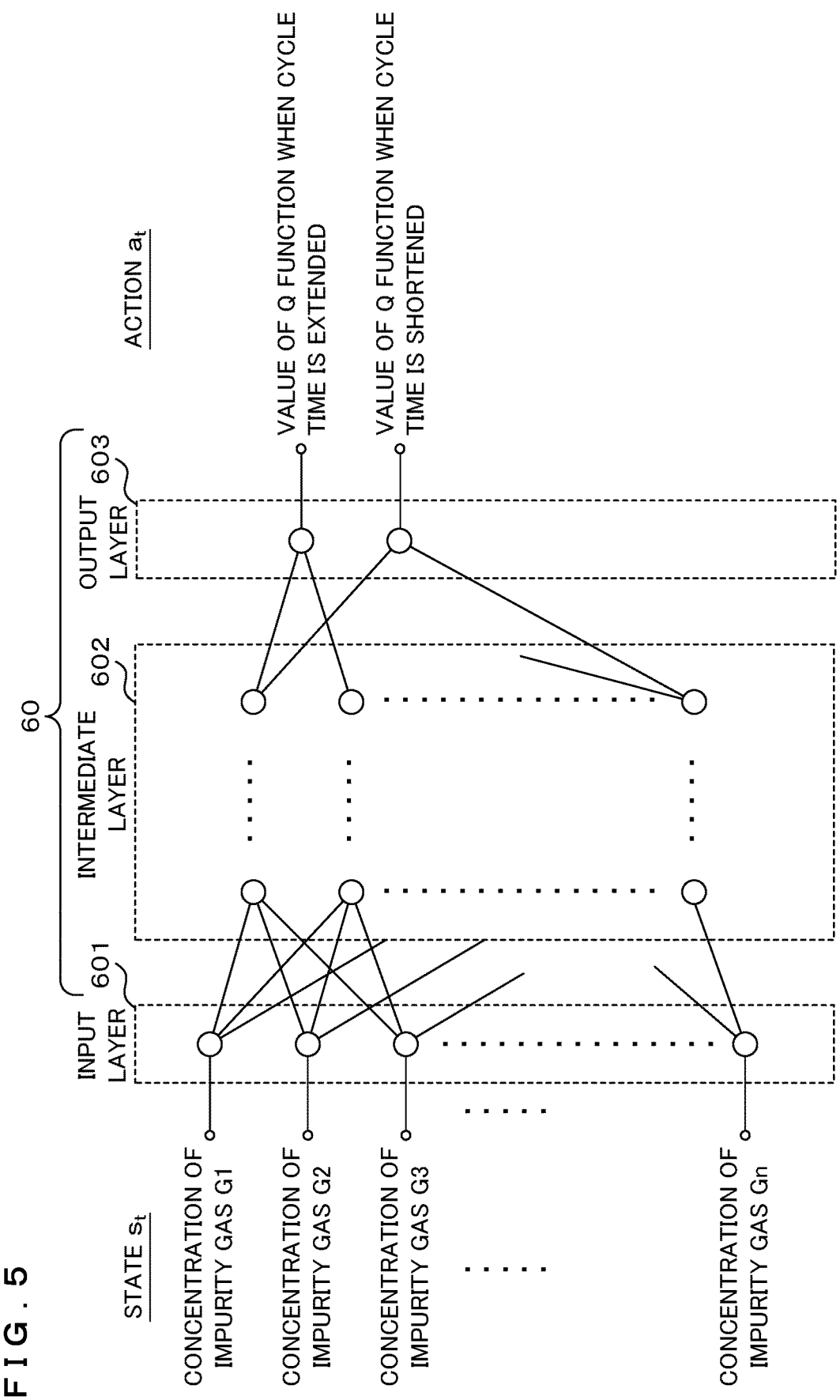
FIG. 5 is schematic view illustrating one example of the configuration of a neural network model unit according to the present embodiment.

FIG. 5 is schematic view illustrating one example of the configuration of a neural network model unit according to the present embodiment. The neural network model unit represents the processing unit 60 (more specifically, the action selection unit 62 and the action evaluation unit 63). The neural network model unit has an input layer 601, an intermediate layer 602 and an output layer 603. The number of input neurons in the input layer 601 can be assumed to be the number of types of impurity gas. To the input neurons in the input layer 601, the concentration of impurity gas G1, the concentration of impurity gas G2 . . . and the concentration of impurity gas Gn are input. The number of types of impurity gas is about four hundreds though not limited thereto.

The number of output neurons in the output layer 603 can be assumed to be the number of options for an action. In FIG. 5, the number of output neurons in the output layer 603 is assumed to be two for convenience. One of the output neurons outputs a value of the Q function when the cycle time is extended, while the other one of the output neurons outputs a value of the Q function when the cycle time is shortened.

The machine learning (deep reinforcement learning) using the neural network model unit can be performed as described below. When a state $s_t$ is input to an input neuron in the neural network model unit, the output neuron outputs $Q(s_t, a_t)$. Here, Q is a function storing an evaluation for an action a in a state s. The update of the Q function can be performed by Formula (1).

$$Q(s_t,a_t) \leftarrow Q(s_t,a_t) + \alpha\{r_{t+1} + \gamma \cdot \max Q(s_{t+1},a_{t+1}) - Q(s_t,a_t)\} \quad (1)$$

$$Q(s_t,a_t) \leftarrow Q(s_t,a_t) + \alpha\{r_{t+1} - Q(s_t,a_t)\} \quad (2)$$

$$Q(s_t,a_t) \leftarrow Q(s_t,a_t) + \alpha\{\gamma \cdot \max Q(s_{t+1},a_{t+1}) - Q(s_t,a_t)\} \quad (3)$$

In Formula (1), $s_t$ indicates a state at a time point t, $a_t$ indicates an action that can be taken at the state $s_t$, $\alpha$ indicates a learning rate (where $0<\alpha<1$), and $\gamma$ indicates a discount rate (where $0<\gamma<1$). The learning rate $\alpha$ is also referred to as a learning factor, and is a parameter to decide the speed (step size) of learning. That is, the learning rate $\alpha$ is a parameter for adjusting the amount of update for a Q value or the Q function. The discount rate $\gamma$ is a parameter for deciding how much the evaluation (reward or penalty) in a future state is considered to be discounted when the Q function is updated. That is, this is a parameter deciding how much the reward or the penalty is to be discounted if an evaluation at a certain state is continuous to an evaluation at a past state.

In Formula (1), $r_{t-1}$ is a reward obtained as a result of an action, and is zero for no reward while being a negative value for a penalty. In the Q learning, a parameter in the neural network model unit is trained such that the second term of the formula (1) $\{r_{t+1} + \gamma \cdot \max Q(s_{t+1}, a_{t+1}) \cdot Q(s_t, a_t)\}$ is zero, that is, $Q(s_t, a_t)$ of the Q function is equal to the sum of the reward ($r_{t+1}$) and the maximum value ($\gamma \cdot \max Q(s_{t+1}, a_{t+1})$) among the possible actions in the next state $s_{t+1}$. The parameter in the neural network model unit is updated such that an error between an expectation value for the reward and an evaluation for a current action approximates to zero. In other words, the value of ($\gamma \cdot \max Q(s_{t+1}, a_{t+1})$) is corrected based on the current $Q(s_t, a_t)$ value and the maximum evaluation value obtained among the evaluation values for the actions that are executable in the state $s_{t+1}$ after the action $a_t$ is taken.

A reward is not necessarily obtained when an action is taken in a certain state. For example, a reward may be obtained after an action is repeated a number of times. Formula (2) shows an update formula of the Q function when a reward can be obtained while the problem of dissipation is avoided in Formula (1). Formula (3) shows an update formula of the Q function when no reward is obtained in Formula (1).

In the example in FIG. 5, the number of output neurons is two though not limited thereto.

FIG. 6 illustrates one example of an action $a_t$. As illustrated in FIG. 6, if the action $a_t$ is for controlling a cycle time (cycle time for switching between the adsorber 22 and the adsorber 23), an action of extending, shortening or maintaining the cycle time can specifically be used. Here, the degree of the cycle time to be extended or shortened can appropriately be set. Meanwhile, if the action $a_t$ is for controlling gas temperature, an action of raising, reducing or maintaining temperature can specifically be used. Here, the degree of the temperature to be raised or reduced can appropriately be set. If the action $a_t$ is for controlling the amount of gas, an action of increasing, reducing or maintaining the amount of gas can specifically be used. Here, the amount of gas to be increased or reduced can appropriately be set. Moreover, if the action $a_t$ is for controlling gas humidity, raising, reducing or maintaining humidity can specifically be used. Here, the degree of the humidity to be raised or reduced can appropriately be set. The output neuron may be configured so as to output the Q function by utilizing all or a part of the actions illustrated in FIG. 6 in combination. It is noted that the action $a_t$ may include the pressure of gas, and for example, raising, reducing or maintaining the pressure of gas may be included.

Figure 7:
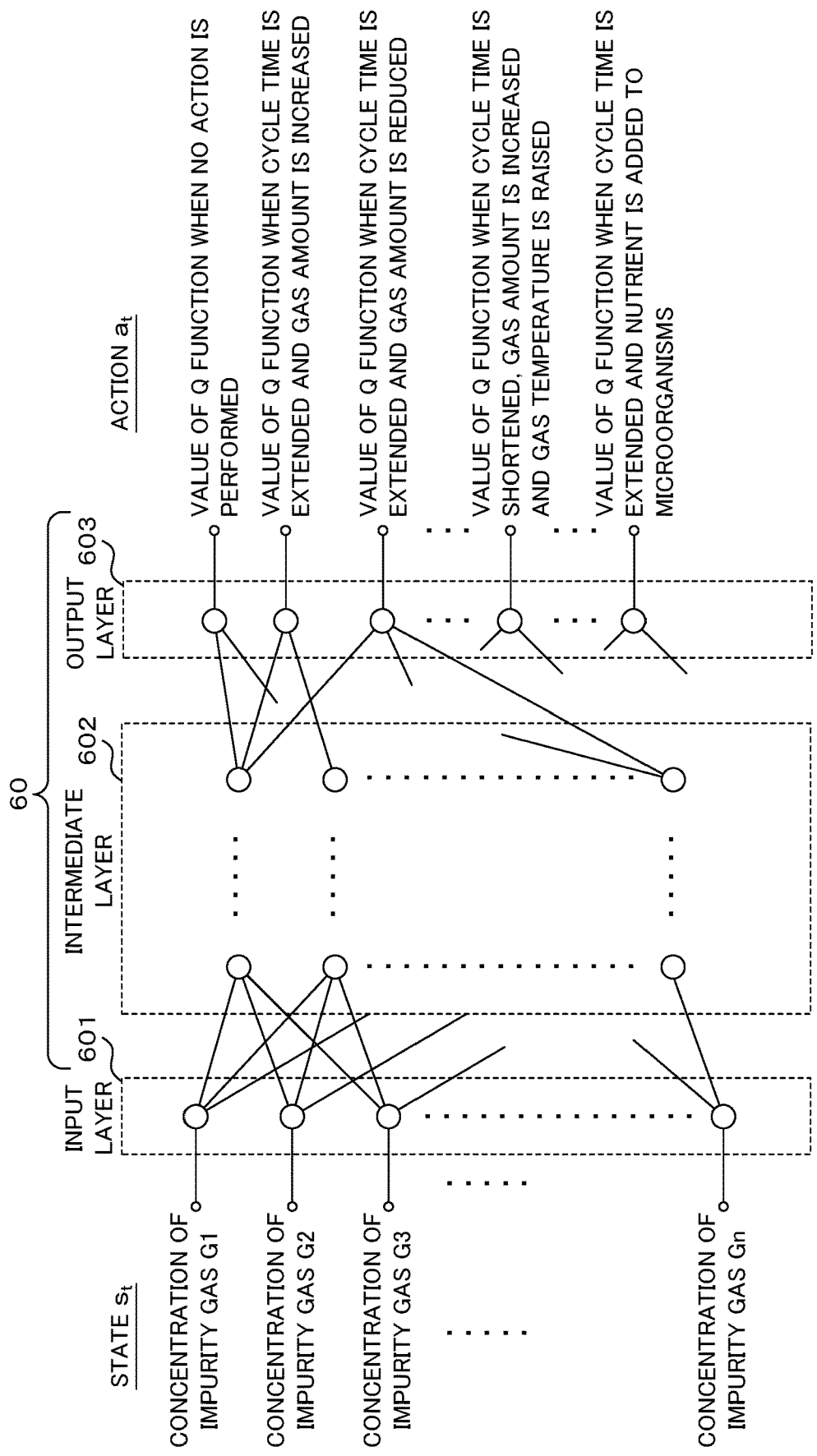
FIG. 7 is a schematic view illustrating another example of the configuration of the neural network model unit according to the present embodiment.

FIG. 7 is a schematic view illustrating another example of the configuration of the neural network model unit according to the present embodiment. The difference from the neural network model unit illustrated in FIG. 5 is that the number of output neurons are increased from two. In the example in FIG. 7, the actions different in type are combined. As illustrated in FIG. 7, the output neurons can be set to, for example, a value of the Q function when no action is performed, a value of the Q function when the cycle time is extended and the gas amount is increased, a value of the Q function when the cycle time is extended and the gas amount is reduced, . . . a value of the Q function when the cycle time is shortened, the gas amount is increased and the gas temperature is raised, . . . a value of the Q function when the cycle time is extended and a nutrient is added to microorganisms, or the like. It is noted that the number of output neurons and the types of the output are not limited to the example in FIG. 7.

It is noted that a convolutional neural network (CNN) may be used for the neural network model unit in FIGS. 5 and 7.

Next, an operation control mode for the gas purification device 20 by the control device 50 will be described.

The processing unit 60 (specifically, the action selection unit 62 and the action evaluation unit 63 as a learning model) has been trained based on gas information on the gas converted by the gasifying furnace 10, control information controlling the gas purification device 20 and information on the gas purified by the gas purification device 20.

The processing unit 60 acquires gas information on the gas converted by the gasifying furnace 10.

The processing unit 60 inputs the gas information into the learning model (the action selection unit 62 and the action evaluation unit 63) to output control information controlling the gas purification device 20.

The control unit 51 can control the gas purification device 20 based on the control information output by the processing unit 60. This makes it possible to optimize the operation of the gas purification device 20 to thereby generate desired ethanol even if the component or composition of waste fluctuates, which allows combustible waste to be reused as industrial raw materials with high efficiency.

Figure 8:
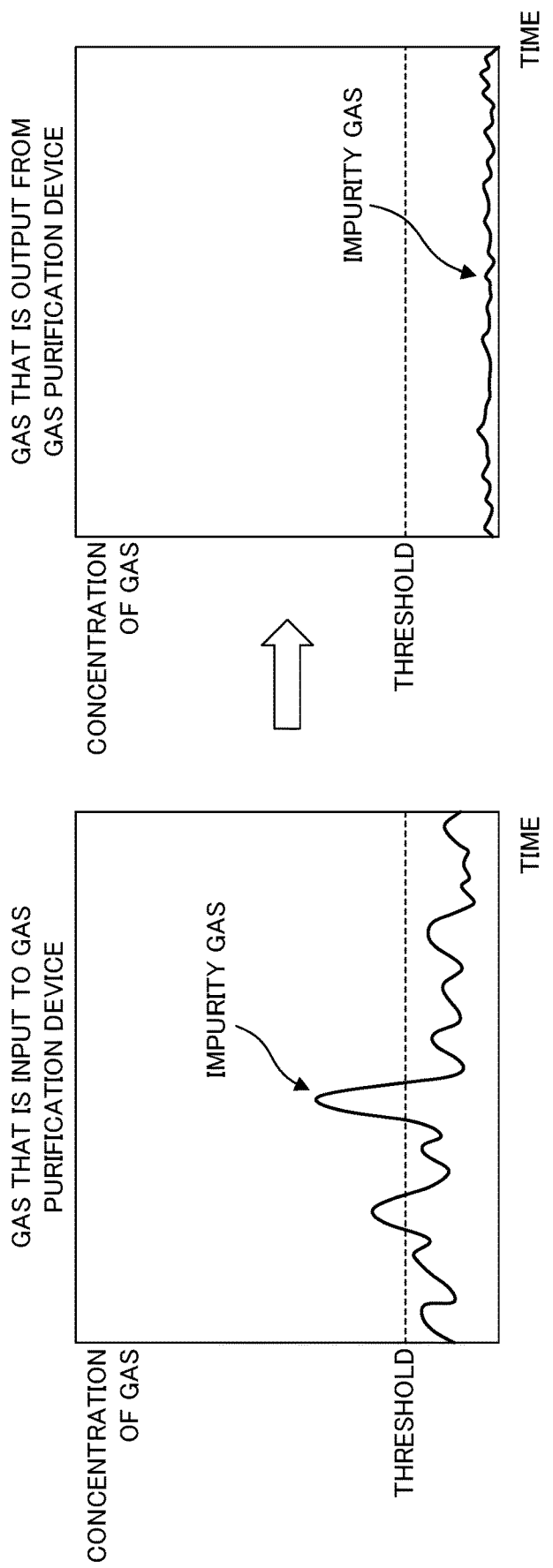
FIG. 8 is a schematic view illustrating one example of the concentration of impurity gas in the case where a control device performs operation control of the gas purifying device.

FIG. 8 is a schematic view illustrating one example of the concentration of impurity gas in the case where the control device 50 performs operation control of the gas purifying device 20. The chart on the left illustrates impurity gas that is input to the gas purification device 20 while the chart on the right illustrates impurity gas that is output from the gas purification device 20. In the drawings, the vertical axis indicates the concentration of gas while the horizontal axis indicates time. As illustrated in the chart on the left, every time the collected combustible waste is put in the gasifying furnace 10 (about once per one minute to 30 minutes, for example), the component or compositions of the waste fluctuates, so that the concentration of the impurity gas may also fluctuate and exceed a threshold. When the impurity gas with the concentration above the threshold is extracted from the gas purification device 20, and is input to the ethanol generation device 30, the purity of the generated ethanol is lowered, for example.

According to the present embodiment, the operation control of the gas purification device 20 is performed by using the trained learning model, so that the concentration of the impurity gas is less than the threshold as illustrated in the chart on the right, which prevents the impurity gas with the concentration above the threshold from entering the ethanol generation device 30.

The control unit 51 can store feature information including the information on the purified gas purified by the gas purification device 20 in the storage unit 55 in the operation control mode of the gas purification device 20. This makes it possible to collect the feature information obtained as a result of optimizing the operation of the gas purification device 20 if the component or composition of the waste fluctuates.

The control unit 51 can transmit the acquired gas information, the output control information and the acquired feature information in the operation control mode of the gas purification device 20 to the learning server 300 that will be described later via the communication unit 54.

The processing unit 60 can retrain the learning model based on the acquired gas information, the output control information and the acquired feature information in the operation control mode of the gas purification device 20. This makes it possible to further optimize the operation of the gas purification device 20.

The control unit 51 can transmit information such as a use history, a degradation level, and the presence or absence of installation and removal operation of the adsorbers 22 and 23 acquired from the gas purification device 20 to the management server 200 that will be described later via the communication unit 54.

Next, the processing in the learning mode according to the present embodiment will be described.

Figure 9:
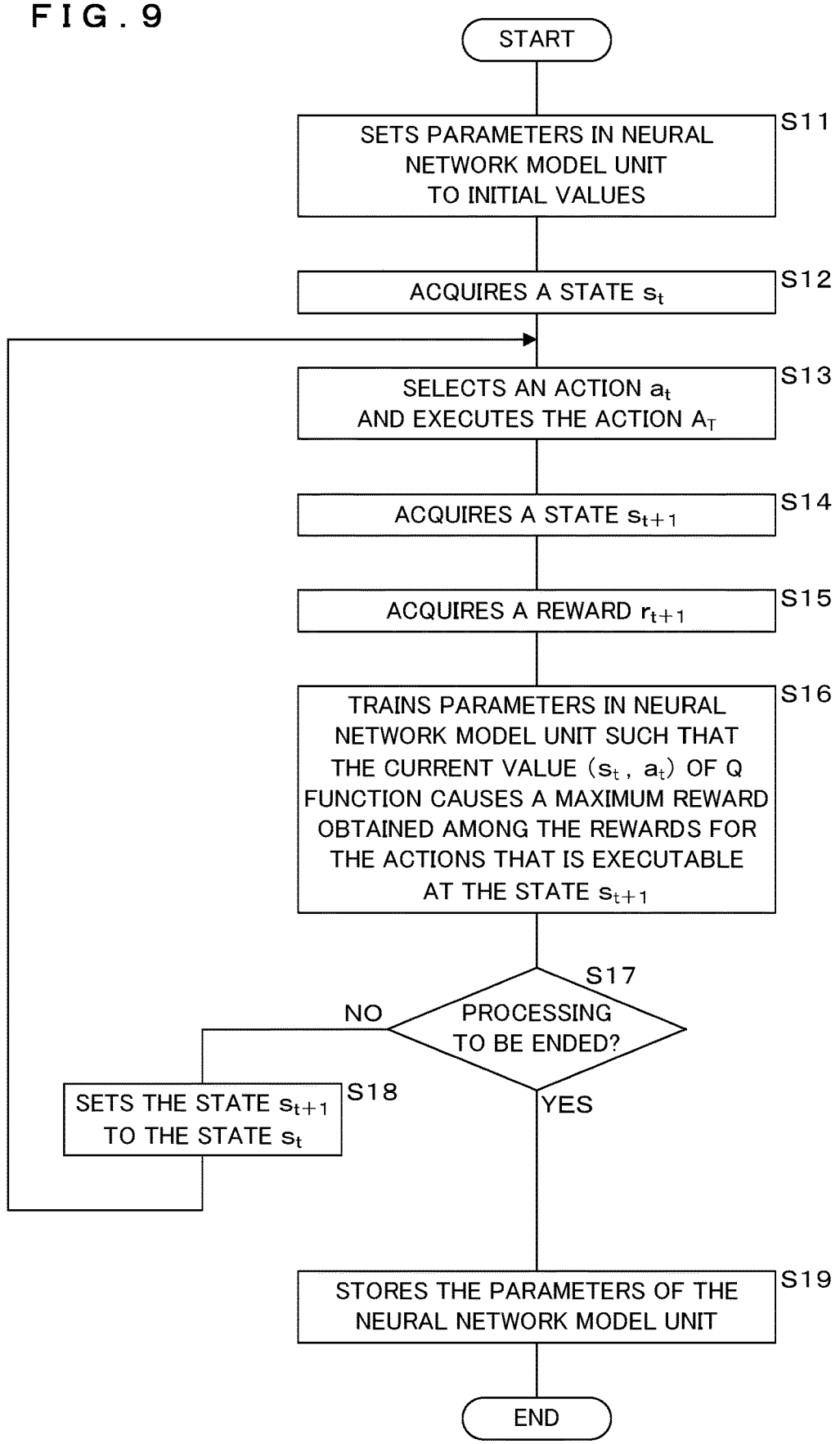
FIG. 9 is a flowchart of one example of a processing procedure of machine learning according to the present embodiment.

FIG. 9 is a flowchart of one example of a processing procedure of the machine learning according to the present embodiment. For convenience, the following description is made regarding the processing unit 60 as the subject for the processing. The processing unit 60 sets parameters in the neural network model unit to initial values (S11). The processing unit 60 acquires a state $s_t$ (S12). The state $s_t$ is gas information on gas converted by the gasifying furnace 10 and is specifically the concentration of impurity gas.

The processing unit 60 selects an action $a_t$ that can be taken at the state $s_t$ and executes the action $a_t$ (S13). The action $a_t$ is control information for performing operation control of the gas purification device 20 and specifically includes a combination of all or part of a cycle time, a gas amount, gas temperature and gas humidity. Furthermore, the action $a_t$ may include an action related to a nutrient fed to microorganisms (catalyst).

The processing unit 60 acquires a state $s_{t+1}$ obtained as a result of the action $a_t$ (S14), and acquires a reward $r_{t+1}$ (S15). The reward can be calculated based on the feature information. The feature information here may include at least one of the information on purified gas (the purity of carbon monoxide gas and hydrogen gas, for example) purified by the gas purification device 20, the purity or quantity of ethanol purified by the ethanol generation device 30 and the activity degree of microorganisms if the microorganisms are used as an example of a catalyst. Note that the reward may be zero (no reward).

The processing unit 60 trains (updates) the parameters in the neural network model unit such that the current value ($s_t$, $a_t$) of the Q function causes a maximum reward obtained among the rewards for the actions that is executable at the state $s_{t+1}$ (S16).

The processing unit 60 determines whether or not the processing is to be ended (S17). Here, whether the processing is to be ended or not may be determined depending on whether or not updating the parameters in the neural network model unit is performed a predetermined number of times, whether or not the feature information is equal to an allowable value or is within an allowable range or the like.

If the processing is not to be ended (NO at S17), the processing unit 60 sets the state $s_{t+1}$ to the state $s_t$ (S18) and continues the processing at and after step S13. If the processing is to be ended (YES at S17), the processing unit 60 stores the parameters of the neural network model unit in the storage unit 55 (S19) and ends the processing. Note that the processing in FIG. 9 can repeatedly be performed. The processing shown in FIG. 9 can repeatedly be executed for each different learning model.

Instead of the learning in which parameters in the neural network model unit are updated as described above, in the learning using a Q table, the Q value of the Q table can be initialized by random numbers, for example, at an initial state of the Q learning. If a difference occurs in the expected value at the initial state of the Q learning once, this prevents a transition to a state that has never been experienced, which may cause a situation where a goal cannot be reached. Hence, in the case where an action in a certain state is decided, a probability e can be used. Specifically, it is possible to randomly select an action from all the actions at a certain probability e and execute the action, and select an action for which the Q value is maximum at the probability $(1-\varepsilon)$ and execute the action. This makes it possible to appropriately advance the learning independent of the initial state of the Q value.

Figure 10:
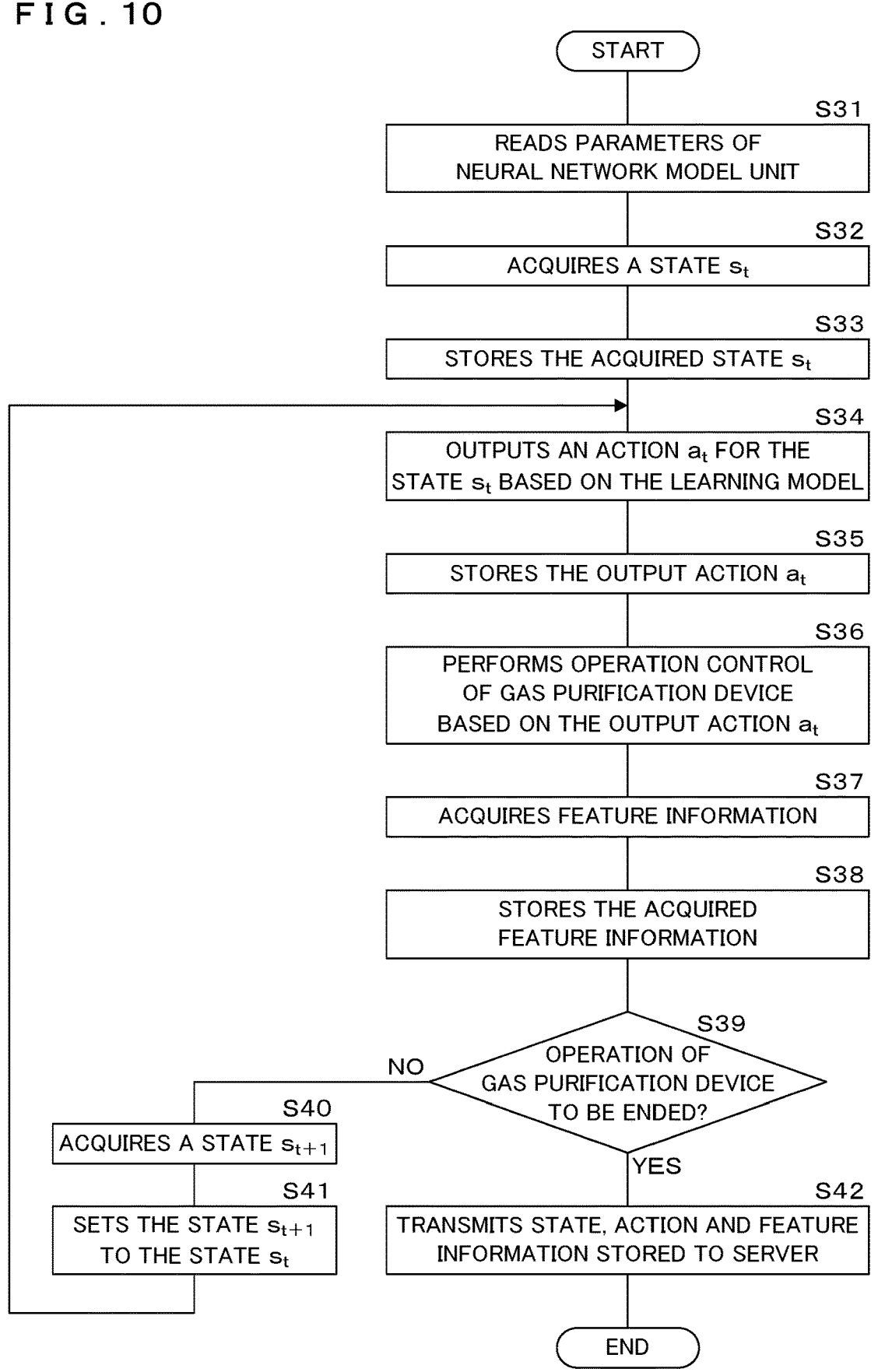
FIG. 10 is a flowchart of one example of a processing procedure in an operation control mode performed by the control device according to the present embodiment.

FIG. 10 is a flowchart of one example of a processing procedure in an operation control mode performed by the control device 50 according to the present embodiment. For convenience, the description will be made regarding the control unit 51 as the subject for the processing. The control unit 51 reads the parameters of the neural network model unit from the storage unit 55 (S31), acquires a state $s_t$ (S32) and stores the acquired state $s_t$ in the storage unit 55 (S33). The state $s_t$ is gas information of the gas converted by the gasifying furnace 10 and is specifically the concentration of the impurity gas.

The control unit 51 outputs an action $a_t$ for the state $s_t$ based on the learning model (S34) and stores the output action $a_t$ in the storage unit 55 (S35). The action $a_t$ is control information for performing operation control of the gas purification device 20 and can specifically be a combination of all or a part of a cycle time, a gas amount, gas temperature and gas humidity. Furthermore, the action $a_t$ may include an action of providing microorganisms (catalyst) with a nutrient.

The control unit 51 performs operation control of the gas purification device 20 based on the output action $a_t$ (S36) and acquires feature information (S37). The control unit 51 stores the acquired feature information in the storage unit 55 (S38).

The control unit 51 determines whether or not the operation of the gas purification device 20 is to be ended (S39). If the operation is not to be ended (NO at step S39), the control unit 51 acquires a state $s_{t+1}$ (S40), sets the state $s_{t+1}$ to the state $s_t$ (S41), and continues the processing at and after step S34. If the operation of the gas purification device 20 is to be ended (YES at S39), the control unit 51 transmits the state, action and feature information stored in the storage unit to a server (the learning server 300) (S42), and ends the processing.

Moreover, the processing unit 60 may retrain the learning model (the action selection unit 62 and the action evaluation unit 63) based on the gas information acquired by the gas information acquisition unit 52, the control information output by the processing unit 60 and the feature information acquired by the feature information acquisition unit 53. This can further optimize the operation of the gas purification device 20.

The control unit 51 and the processing unit 60 according to the present embodiment can also be implemented by using a computer provided with a CPU (processor), a GPU, a RAM (memory), etc. For example, a computer program and data (trained Q function or Q value, for example) recorded in a recording medium (optically readable disc storage medium, for example, a CD-ROM, or the like) can be read by a recording medium reading unit 57 (optical disc drive, for example), and stored in the RAM. They may be stored in a hard disk (not illustrated), and may be stored in the RAM when the computer program is executed. The computer programs defining the procedure of respective processing as illustrated in FIG. 9 and FIG. 10 are loaded into the RAM (memory) provided in the computer, and the computer programs are executed by the CPU (processor) to allow the control unit 51 and the processing unit 60 to be implemented on the computer.

In the above-mentioned embodiment, the Q learning is described as one example of the machine learning. Alternatively, another learning algorithm such as temporal difference (TD) learning may be employed. For example, a learning method in which the value of a state, not the value of an action as in the Q learning, is updated may be employed. In this method, the value $V(s_t)$ in the current state $s_t$ is updated by using the formula $V(s_t) \leftarrow V(s_t) + \alpha \cdot \delta_t$, where $\delta t = r_{t+1} + \gamma \cdot V(s_{t+1}) - V(s_t)$, $\alpha$ is a learning rate, and $\delta_t$ is a TD error.

As mentioned above, according to the present embodiment, the collected combustible waste can be converted into ethanol with a significantly high generation efficiency, which allows combustible waste to be reused as industrial raw materials with high efficiency.

In the above-mentioned embodiment, a single waste disposal facility (also referred to as a plant) is described. However, the present embodiment can be applied to multiple plants respectively established in multiple places (regions).

Figure 11:
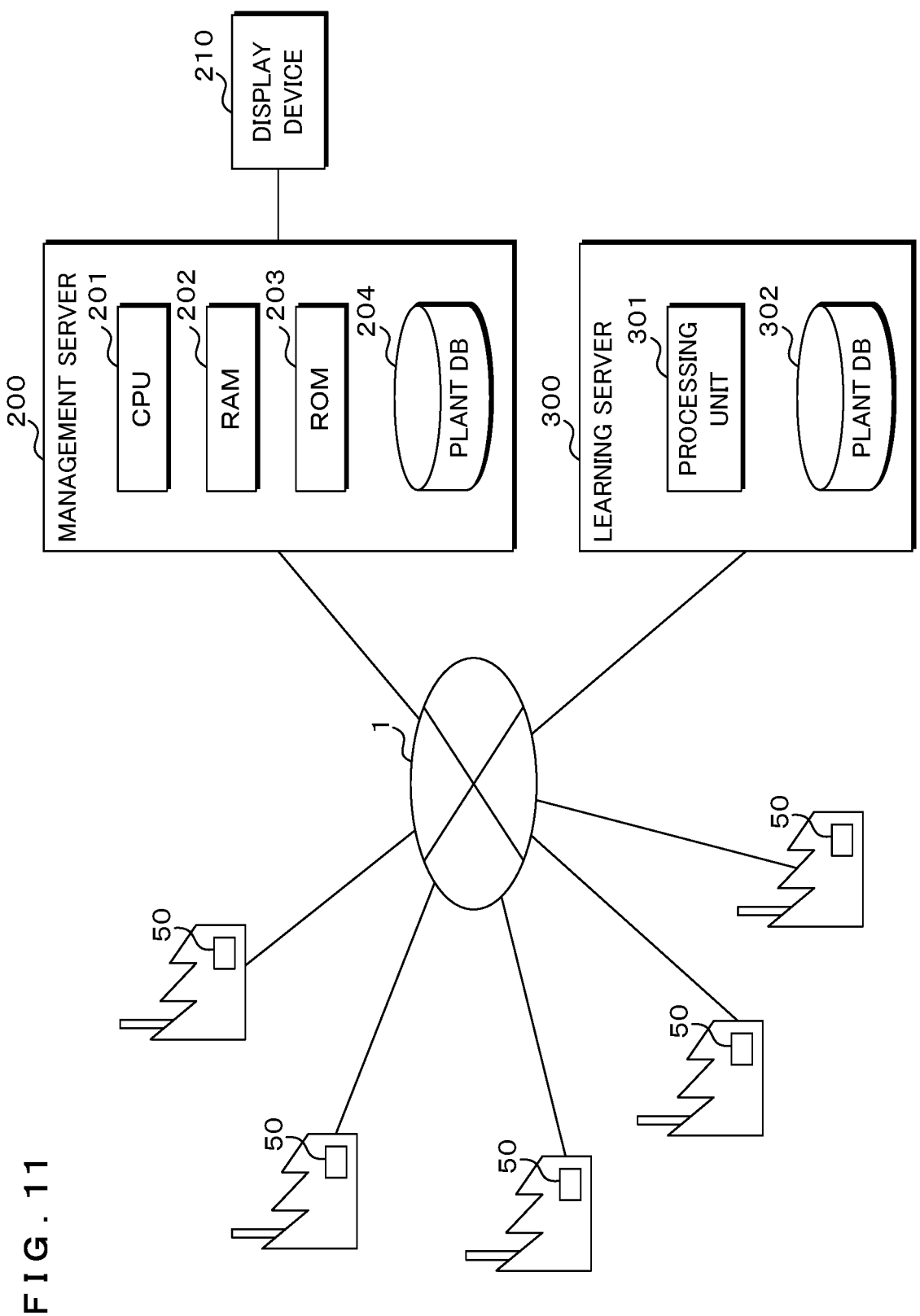
FIG. 11 is a schematic view illustrating one example of the configuration of a management system for managing multiple plants.

FIG. 11 is a schematic view illustrating one example of the configuration of a management system for managing multiple plants. As illustrated in FIG. 11, respective control devices 50 installed in multiple plants are connected to a network 1 such as the Internet or the like. The network 1 is connected to the management server 200 and the learning server 300. Information can be transmitted and received between the respective control devices 50 and the management server 200 as well as the learning server 300 via the network 1. The management server 200 is provided with a CPU 201, a RAM 202, a ROM 203 and a plant DB 204 while being connected to a display device 210. It is noted that the management server 200 (CPU 201) can control the processing of the display device 210. The learning server 300 is provided with a processing unit 301 and a plant DB 302. The processing unit 301 has a configuration similar to the processing unit 60 in the control device 50.

Each of the control devices 50 can transmit acquired gas information, output control information, acquired feature information and identification information for identifying a plant to the learning server 300 in the operation control mode of the gas purification device 20. The learning server 300 can collect from each of the control devices 50 identification information identifying a plant, gas information on gas converted by the gasifying furnace 10, control information controlling the gas purification device 20 and feature information including the information on the purified gas purified by the gas purification device 20. The learning server 300 can store the collected gas information, control information and feature information in association with the identification information in the plant DB 302. This enables collection and recording of the information necessary for optimizing the operation of the gas purification device 20 for each plant.

The learning server 300 can collect information on how to control the operation of the gas purification device 20 for obtaining desired feature information if the component or composition of waste fluctuates. In addition, the respective control devices 50 in the multiple waste disposal facilities (plants) transmit similar information, so that the learning server 300 can collect information on how to control the operation of the gas purification device 20 for obtaining desired feature information for each plant.

The processing unit 301 can train the learning model based on the collected gas information, control information and feature information. This allows the learning server 300 to create a learning model individualized for each of the waste disposal facilities (plants) established in various regions, respectively. This also makes it possible to deliver a learning model suitable for each plant in the case where a control device 50 is newly installed in the existing waste disposal facility, or in the case where a new plant is newly built. Note that in the case where a learning model is delivered to a plant (specifically to the control device 50), the learning model (algorithm, parameters, etc.) can be encoded by using a secret key or the like and delivered. In each control device 50, the encoded learning model may be decoded by using a unique secret key.

Each of the control devices 50 can transmit the information such as a use history, a degradation level and the presence or absence of installation and removal operation of the adsorbers 22 and 23, the activity degree of a catalyst (for example, microorganisms), etc. that are acquired from the gas purification device 20 to the management server 200.

The management server 200 collects, from each of a plurality of waste disposal plants, identification information identifying a plant and a degradation level of the adsorbers 22 and 23 provided in a gas purification device 20 for purifying gas having been converted by a gasifying furnace for converting collected waste to gas.

The management server 200 stores the degradation level collected in association with the identification information in the plant DB 204.

The management server 200 can calculate the number of remaining usable times and the remaining usable time period until replacement of the adsorbers 22 and 23 based on the use history to thereby estimate a replacement time of the adsorbers 22 and 23. In addition, the respective control devices in the multiple waste disposal facilities (plants) transmit similar information, so that the management server 200 can estimate a replacement time of the adsorbers 22 and 23 in the gas purification device 20 for each plant.

FIG. 12 is a schematic view illustrating one example of a plant list screen 211 displayed by the display device 210. As illustrated in FIG. 12, the plant list screen 211 includes a plant ID display area 212, an adsorber degradation level display area 213, an alert display area 214, and a catalyst (microorganisms, for example) activity degree display area 215. The management server 200, that is, the operator who monitors the display screen of the display device 210 can determine whether or not maintenance, inspection or replacement of the adsorbers 22 and 23 is necessary for each plant based on the degradation level of the adsorbers for each plant that is displayed on the adsorber degradation level display area 213. In every plant in the example in FIG. 12, the degradation level of the adsorber does not reach the value indicating replacement.

Furthermore, the management server 200, that is, the operator who monitors the display screen of the display device 210 can recognize that unintentional installation and removal operation of each of the adsorbers 22 and 23 is present if an alert light of the alert display area 214 is turned on, or on and off. This enables the operator to find installation of an adsorber that is not an authorized product, for example, and prevents installation of an unauthorized product. Moreover, the respective control devices 50 in the multiple waste disposal facilities (plants) transmit similar information, so that the management server 200 can find the installation of an adsorber that is not an authorized product, to thereby prevent installation of an unauthorized product for each plant.

In addition, the management server 200, that is, the operator who monitors the display screen of the display device 210 can identify whether the activity degree is OK or NG in the catalyst activity degree display area 215. FIG. 12 shows that the activity degree is assumed as OK. This makes it possible to remotely provide an instruction of adding a nutrient if the activity degree of the microorganisms is lowered, for example, to thereby activate the microorganisms again, which maintains the generation speed of ethanol at a higher level.

Figure 13:
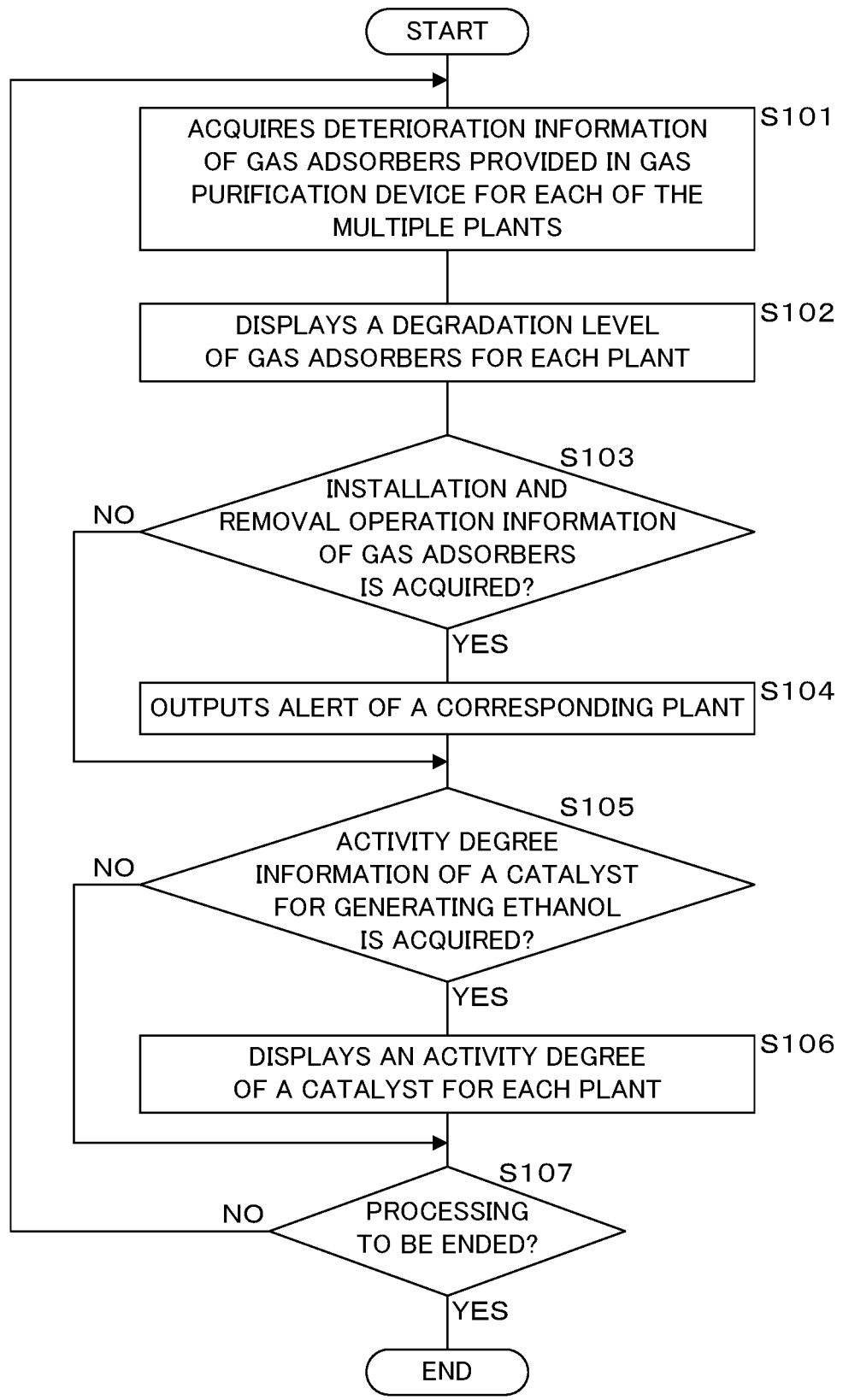
FIG. 13 is a flowchart of one example of a processing procedure performed by a management server.

FIG. 13 is a flowchart of one example of a processing procedure performed by the management server 200. For convenience, the following description is made regarding the CPU 201 as the subject of the processing. The CPU 201 acquires the deterioration information of the gas adsorbers 22 and 23 provided in the gas purification device 20 for each of the multiple plants (S101) and displays a degradation level of the gas adsorbers 22 and 23 for each plant (S102).

The CPU 201 determines whether or not the installation and removal operation information of the gas adsorbers 22 and 23 is acquired (S103). The installation and removal operation information here is information indicating that unintentional installation and removal operation of the gas adsorbers 22 and 23 is present and excluding the installation and removal operation performed when the gas adsorbers 22 and 23 are cleaned.

The CPU 201 outputs an alert (alert light of the alert display area 214 shown in FIG. 12, for example) of a corresponding plant (S104) if acquiring the installation and removal operation information of the gas adsorbers 22 and 23 (YES at S103). The alert may be output by lighting or blinking of an indicator lamp or by sound. Alternatively, an alert may be notified to the portable terminal device (not illustrated) of the operator. If not acquiring the installation and removal operation information of the gas adsorbers 22 and 23 (NO at S103), the CPU 201 performs the following processing at step S105.

The CPU 201 determines whether or not activity degree information of a catalyst (microorganisms, for example) for generating ethanol is acquired (S105). If acquiring the activity degree information (YES at S105), the CPU 201 displays an activity degree of a catalyst (microorganisms, for example) for each plant (S106) and determines whether or not the processing is to be ended (S107). The CPU 201 performs the processing at step S107 if not acquiring the activity degree information (NO at S105). The CPU 201 continues the processing at and after step S101 if the processing is not to be ended (NO at S107) and ends the processing if the processing is to be ended (YES at S107).

In the above described embodiment, the management server 200 or the learning server 300 may be constituted by multiple servers. Alternatively, the management server 200 and the learning server 300 may be integrated into a single server.

Figure 14:
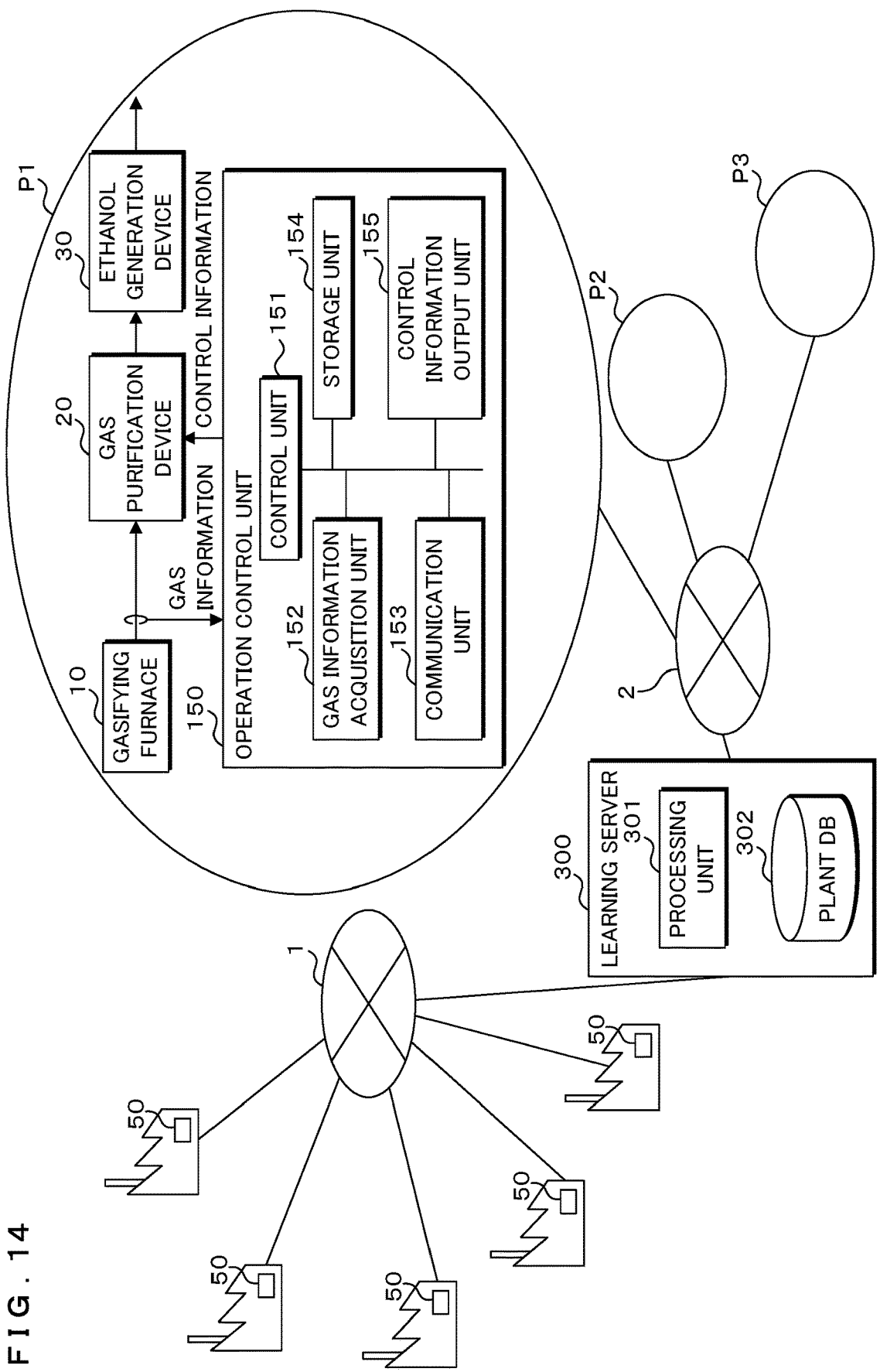
FIG. 14 is a schematic view illustrating one example of the configuration of an operation control device controlling the operation of a target gas purification device using a learning server.

FIG. 14 is a schematic view illustrating one example of the configuration of an operation control device 150 controlling the operation of a target gas purification device using the learning server 300. Similarly to FIG. 11, the learning server 300 is connected to respective control devices 50 provided in multiple plants via the network 1. The learning server 300 is provided with a processing unit 301, and the processing unit 301 includes a trained learning model similarly to the processing unit 60.

The learning server 300 is connected to respective operation control devices 150 in multiple plants P1, P2 and P3 via the network 2 such as the Internet or the like. The learning server 300 and the operation control devices 150 can transmit and receive required information to and from each other. The learning server 300 and the operation control devices 150 may be established in different countries or regions. Alternatively, the learning server 300 and the respective control devices 50 may be established in the same country. For convenience, only the plant P1 is illustrated in detail.

The plant P1 is equipped with a target gasifying furnace 10, a target gas purification device 20 and a target ethanol generation device 30. The "target" here means a subject to be operationally controlled by the operation control device 150. The target gasifying furnace 10, the target gas purification device 20, and the target ethanol generation device 30 respectively have similar functions to the gasifying furnace 10, the gas purification device 20 and the ethanol generation device 30 that are illustrated in FIG. 1, and thus the description thereof will not be made here.

The operation control device 150 is provided with a control unit 151 for controlling the whole device, a gas information acquisition unit 152, a communication unit 153, a storage unit 154 and a control information output unit 155. As illustrated in the drawing, the operation control device 150 is not equipped with a processing unit 60 (learning model).

The control unit 151 can be constituted by a CPU, a ROM, a RAM, etc.

The gas information acquisition unit 152 acquires gas information on gas converted by the target gasifying furnace 10. The gas information includes, for example, the concentration of impurity gas (foreign substance) extracted from the gasifying furnace 10. The impurity gas includes gas, for example, hydrogen cyanide, benzene, toluene, ethylbenzene, xylene, dioxin or the like though the types of the impurity gas are not limited thereto. Note that the concentration of the impurity gas fluctuates depending on the component or composition of miscellaneous waste.

The storage unit 154 is constituted by a hard disk, a flash memory or the like and can store required information such as information acquired from the outside of the operation control device 150.

The control information output unit 155 outputs control information for controlling the target gas purification device 20 that is obtained by inputting the gas information acquired by the gas information acquisition unit 152 to the learning model.

The learning model here has been trained based on gas information on gas converted by a gasifying furnace (gasifying furnace different from the target gasifying furnace 10) for converting the collected waste to gas, control information controlling a gas purification device (gas purification device different from the target gas purification device 20) for purifying the gas converted by this gasifying furnace and feature information including information on the purified gas purified by this gas purification device.

According to the above described configuration, even if not provided with a learning model, the operation control device 150 can provide the learning model with the gas information acquired by the gas information acquisition unit 152 and can control the operation of the target gas purification device 20 based on the control information obtained from this learning model.

More specifically, the communication unit 153 has functions as a transmission unit and a reception unit. The communication unit 153 transmits the gas information acquired by the gas information acquisition unit 152 to the learning server 300. The learning server 300 includes a learning model. The learning model has been trained based on gas information converted by a gasifying furnace, control information controlling a gas purification device for purifying the gas converted by the gasifying furnace and feature information including the information on the purified gas purified by the gas purification device.

The communication unit 153 receives control information controlling the gas purification device transmitted by the learning server 300. The control information output unit 155 outputs the control information received by the communication unit 153 to the target gas purification device 20.

In the above-described configuration, even if not provided with a learning model, the operation control device 150 can transmit the gas information acquired by the gas information acquisition unit 152 to the learning server 300 provided with the learning model, receive control information transmitted from the learning server 300, and control the operation of the target gas purification device 20 based on the received control information. Thus, the operation control device 150 can control the operation of the target gas purification device 20 by using the learning model provided in the learning server 300 connected thereto through a network such as the Internet or the like. This enables operation control of the target gas purification device 20 even if the learning server 300 and the operation control device 150 are established in different countries or regions, for example.

In the above described configuration, the operation control device 150 is configured to acquire gas information by the gas information acquisition unit 152 though the information to be acquired is not limited to the above-described gas information. For example, the operation control device 150 may be configured to acquire information (control information and feature information) necessary for training the learning model as well as the gas information, and may transmit the acquired gas information, control information and feature information to the learning server 300 to thereby train the learning model provided in the learning server 300. This allows the operation control device 150 to train the learning model in the learning server 300 based on the information on the target gasifying furnace 10, the target gas purification device 20 and the target ethanol generation device 30, to thereby perform operation control of the target gas purification device 20 with more accuracy. Thus, the collected combustible waste in the plant P1 can be converted into ethanol with a significantly high generation efficiency, which allows combustible waste to be reused as industrial raw materials with high efficiency.

A control device according to the present embodiment is a control device for controlling a gas purification device, and comprises: a gas information acquisition unit that acquires gas information on gas converted by a gasifying furnace for converting collected waste to gas; a control information acquisition unit that acquires control information controlling the gas purification device for purifying gas converted by the gasifying furnace; a feature information acquisition unit that acquires feature information including information on purified gas purified by the gas purification device; and a creation unit that creates a learning model by machine learning based on the gas information, the control information and the feature information.

A computer program according to the present embodiment causes a computer to execute the following processing of: acquiring gas information on gas converted by a gasifying furnace for converting collected waste to gas, acquiring control information controlling a gas purification device for purifying gas converted by the gasifying furnace; acquiring feature information including information on purified gas purified by the gas purification device; and creating a learning model by machine learning based on the gas information, the control information and the feature information.

A control method according to the present embodiment is a control method for controlling a gas purification device, and comprises: acquiring gas information on gas converted by a gasifying furnace for converting collected waste to gas; acquiring control information controlling the gas purification device for purifying gas converted by the gasifying furnace; acquiring feature information including information on purified gas purified by the gas purification device; and creating a learning model by machine learning based on the gas information, the control information and the feature information.

The gas information acquisition unit acquires gas information on gas converted by the gasifying furnace for converting collected waste to gas. The gasifying furnace is a furnace capable of steaming and baking waste under low-oxygen conditions to break down the waste into the molecular level (including carbon monoxide gas and hydrogen gas, for example). The gas information includes, for example, the concentration of impurity gas (foreign substance) generated by the gasifying furnace. Note that the concentration of the impurity gas fluctuates depending on the component or composition of miscellaneous waste.

The control information acquisition unit acquires control information controlling the gas purification device for purifying the gas converted by the gasifying furnace. The gas purification device removes or purifies impurity gas included in the gas converted by the gasifying furnace to thereby extract required gas (carbon monoxide gas and hydrogen gas, for example). The control information is information for performing operation control of the gas purification device.

The feature information acquisition unit acquires feature information including information on the purified gas purified by the gas purification device. The information on the purified gas includes, for example, the purity of carbon monoxide gas and hydrogen gas. The information on the purified gas may include the concentration of the impurity gas that failed to be removed. The purified gas can be converted into ethanol using a catalyst (metal catalyst and microbial catalyst, for example). Ethanol has $C_2$ structure similar to ethylene that accounts for approximately 60% of petrochemical products and is converted into an ethylene monomer or a butadiene monomer by the existing chemical process, to derive an induced chemical material such as plastic or the like. The feature information includes the activity degree of a catalyst (microorganisms, for example) for generating ethanol from carbon monoxide gas and hydrogen gas as well as the purity and quantity of the generated ethylene.

The creation unit creates a learning model by machine learning based on the gas information, the control information and the feature information. As the machine learning, deep learning, reinforcement learning, deep reinforcement learning, for example, may be used. If the reinforcement learning is used, for example, a "reward" is calculated based on the feature information when the gas information is assumed as a "state" and the control information is assumed as an "action," so that the Q value or a value of the Q function (action value function) may be trained.

Thus, the learning model can be trained so as to output control information that allows the feature information on the output side of the gas purification device to be equal to a required value or to be within a required range even if the concentration of the gas (impurity gas) input to the gas purification device exceeds a threshold due to the wide fluctuation in component or composition of the waste. By using the trained learning model, the operation of the gas purification device can be optimized to generate desired ethanol even if the component or composition of the waste fluctuates, which allows combustible waste to be reused as industrial raw materials with high efficiency.

In the control device according to the present embodiment, the creation unit comprises an action output unit that outputs the control information based on gas information acquired by the gas information acquisition unit and action evaluation information, a reward calculation unit that calculates a reward based on feature information acquired by the feature information acquisition unit, and an update unit that updates the action evaluation information such that a reward calculated by the reward calculation unit is increased.

The action output unit outputs control information based on the gas information acquired by the gas information acquisition unit and the action evaluation information. The action evaluation information is an evaluation value for an action in the reinforcement learning and is the same as Q value or a Q function (action value function). That is, the action output unit selects and outputs an action from the actions that can be taken in the acquired state based on the evaluation value of the action in the acquired state.

The reward calculation unit calculates reward based on the feature information acquired by the feature information acquisition unit. The calculation of the reward can be performed such that the reward is made positive (rewarded) if the feature information is equal to a required value or is within a required range while the reward is 0 (not rewarded) or is made negative (provided with penalty) if the feature information is not equal to a required value or is not within a required range.

The update unit updates the action evaluation information such that the reward calculated by the reward calculation unit is increased. Thus, the learning model can be trained so as to output control information that allows the feature information on the output side of the gas purification device to be equal to a required value or to be within a required range even if the concentration of the gas (impurity gas)

input to the gas purification device exceeds a threshold due to the wide fluctuation in component or composition of the waste.

The control device according to the present embodiment further comprises a storage unit that stores action evaluation information updated by the update unit.

The storage unit stores action evaluation information updated by the update unit. By reading out the action evaluation information stored in the storage unit, the trained learning model can be recreated.

In the control device according to the present embodiment, the gas information acquisition unit acquires gas information including concentration of impurity gas.

The gas information acquisition unit acquires gas information including the concentration of impurity gas. The impurity gas includes gas such as hydrogen cyanide, benzene, toluene, ethylbenzene, xylene, dioxin or the like, though the types of the impurity gas are not limited thereto. This makes it possible to remove impurity gas and thoroughly remove foreign substance included in the gas generated from the gasifying furnace.

In the control device according to the present embodiment, the feature information acquisition unit acquires feature information including at least one of purity of carbon monoxide gas and hydrogen gas, purity or quantity of ethanol and an activity degree of a catalyst for generating ethanol from carbon monoxide gas and hydrogen gas.

The feature information acquisition unit acquires feature information including at least one of purity of carbon monoxide gas and hydrogen gas, purity or quantity of ethanol and an activity degree of a catalyst (microorganisms, for example) for generating ethanol from carbon monoxide gas and hydrogen gas. This allows the feature information to be equal to a required value or be within a required range.

In the control device according to the present embodiment, the control information acquisition unit acquires control information including at least one of a gas amount, gas temperature and gas humidity of the gas purification device, and a switching cycle time of an adsorber provided in the gas purification device.

The control information acquisition unit acquires control information including at least one of a gas amount, gas temperature and gas humidity of the gas purification device, and a switching cycle time of an adsorber provided in the gas purification device. The gas adsorption member is provided in the adsorber, and is a member for adsorbing and capturing impurities. The switching cycle time is a use time of one of the adsorbers if two adsorbers are alternately switched for use, for example. During the switching cycle time of one of the adsorbers, the other one of the adsorption members that is not in use can be removed to clean the impurities adhering to the gas adsorption member. This makes it possible to perform operation control of the gas purification device such that the feature information is equal to a required value or within a required range.

A control device according to the present embodiment is a control device for controlling a gas purification device, and comprises: a learning model trained based on gas information on gas converted by a gasifying furnace for converting collected waste to gas, control information controlling the gas purification device for purifying gas converted by the gasifying furnace, and feature information including information on purified gas purified by the gas purification device; a gas information acquisition unit that acquires gas information on gas converted by the gasifying furnace; and an output unit that inputs gas information acquired by the gas information acquisition unit to the learning model to output control information for controlling the gas purification device.

A computer program according to the present embodiment causes a computer to execute the processing of: acquiring gas information on gas converted by a gasifying furnace for converting collected waste to gas; and outputting control information controlling a gas purification device by inputting acquired gas information to a learning model trained based on gas information on gas converted by the gasifying furnace, control information controlling the gas purification device for purifying gas converted by the gasifying furnace and feature information including information on purified gas purified by the gas purification device.

A learning model according to an embodiment of the present invention has been trained based on gas information on gas converted by a gasifying furnace for converting collected waste to gas, control information controlling a gas purification device for purifying gas converted by the gasifying furnace, and feature information including information on purified gas purified by the gas purification device.

A control method according to the present embodiment is a control method for controlling a gas purification device, and comprises: acquiring gas information on gas converted by a gasifying furnace for converting collected waste to gas; and outputting control information controlling the gas purification device by inputting the acquired gas information to a learning model trained based on gas information on gas converted by the gasifying furnace, control information controlling the gas purification device for purifying gas converted by the gasifying furnace and feature information including information on purified gas purified by the gas purification device.

The learning model is trained based on gas information on gas converted by the gasifying furnace for converting collected waste to gas, control information controlling the gas purification device for purifying gas converted by the gasifying furnace and feature information including information on purified gas purified by the gas purification device.

The gas information includes, for example, the concentration of impurity gas (foreign substance) generated by the gasifying furnace. Note that the concentration of the impurity gas fluctuates depending on the component or composition of miscellaneous waste. The control information is information for performing operation control of the gas purification device. The feature information includes, for example, purity of carbon monoxide gas and hydrogen gas, an activity degree of a catalyst (microorganisms, for example) for generating ethanol from carbon monoxide gas and hydrogen gas, and the purity or quantity of the generated ethylene.

The learning model is trained by using, for example, deep learning, reinforcement learning, deep reinforcement learning, or the like.

The gas information acquisition unit acquires gas information on gas converted by the gasifying furnace. The gasifying furnace is a furnace capable of steaming and baking waste under low oxygen conditions to break down the waste into the molecular level (including carbon monoxide gas and hydrogen gas, for example). The gas information includes, for example, the concentration of impurity gas (foreign substance) generated by the gasifying furnace. Note that the concentration of the impurity gas fluctuates depending on the component or composition of miscellaneous waste.

The output unit outputs control information controlling the gas purification device by inputting the gas information acquired by the gas information acquisition unit to the learning model. This makes it possible to optimize the operation of the gas purification device to generate desired ethanol even if the component or composition of the waste fluctuates, which allows combustible waste to be reused as industrial raw materials with high efficiency.

In the control device according to the present embodiment, the gas purification device is controlled based on control information output by the output unit.

The gas purification device is controlled based on the control information output by the output unit. This makes it possible to optimize the operation of the gas purification device to generate desired ethanol even if the component or composition of the waste fluctuates, which allows combustible waste to be reused as industrial raw materials with high efficiency.

The control device according to the present embodiment further comprises a feature information acquisition unit that acquires feature information including information on purified gas purified by the gas purification device; and a storage unit that stores feature information acquired by the feature information acquisition unit.

The feature information acquisition unit acquires feature information including information on purified gas purified by the gas purification device, and the storage unit stores the acquired feature information. This makes it possible to collect the feature information obtained as a result of optimizing the operation of the gas purification device in the case where the component or composition of the waste fluctuates.

The control device according to the present embodiment, further comprises a transmission unit that transmits gas information acquired by the gas information acquisition unit, control information output by the output unit and feature information acquired by the feature information acquisition unit to a server.

The transmission unit transmits gas information acquired by the gas information acquisition unit, control information output by the output unit and feature information acquired by the feature information acquisition unit to the server. Thus, the server can collect information on how to control the operation of the gas purification device for obtaining desired feature information if the component or composition of waste fluctuates. In addition, the respective control devices in the multiple waste disposal facilities (plants) transmit similar information to the server, whereby the server can collect information on how to control the operation of the gas purification device for obtaining desired feature information for each plant.

The control device according to the present embodiment, further comprises a learning processing unit that retrains the learning model based on gas information acquired by the gas information acquisition unit, control information output by the output unit and feature information acquired by the feature information acquisition unit.

The learning processing unit retrains the learning model based on gas information acquired by the gas information acquisition unit, control information output by the output unit and feature information acquired by the feature information acquisition unit. This makes it possible to further optimize the operation of the gas purification device.

The control device according to the present embodiment, further comprises a use history acquisition unit that acquires a use history of an adsorber provided in the gas purification device; and a transmission unit that transmits a use history acquired by the use history acquisition unit to a management server.

The use history acquisition unit acquires a use history of an adsorber provided in the gas purification device. The use history includes a cumulative use time, the number of times for cleaning, for example.

The transmission unit transmits the use history acquired by the use history acquisition unit to the management server. The management server can calculate the number of remaining usable times and the remaining usable time period until replacement of the adsorbers based on the use history to thereby estimate a replacement time of the adsorbers. In addition, the respective control devices in the multiple waste disposal facilities (plants) transmit similar information, whereby the management server can estimate a replacement time of the adsorbers provided in the gas purification device for each plant.

The control device according to the present embodiment further comprises a degradation level acquisition unit that acquires a degradation level of an adsorber provided in the gas purification device, and the transmission unit transmits a degradation level acquired by the degradation level acquisition unit to the management server.

The degradation level acquisition unit acquires a degradation level of an adsorber provided in the gas purification device. The degradation level may be determined by, for example, the color of or dirt on the surfaces of the gas adsorption members after cleaning the gas adsorption members and the amount of impurities adsorbed during a predetermined cycle time.

The transmission unit transmits a degradation level acquired by the degradation level acquisition unit to the management server. The management server can determine whether or not maintenance, inspection or replacement of the adsorbers is necessary based on the degradation level. In addition, the respective control devices in the multiple waste disposal facilities (plants) transmit similar information, so that the management server can determine whether or not maintenance, inspection or replacement of the adsorbers provided in the gas purification device is necessary for each plant.

The control device according to the present embodiment further comprises an installation and removal operation acquisition unit that acquires a presence or absence of installation and removal operation of an adsorber provided in the gas purification device, and the transmission unit transmits, if presence of installation and removal operation is acquired by the installation and removal operation acquisition unit, the presence of the installation and removal operation to the management server.

The installation and removal operation acquisition unit acquires presence or absence of installation and removal operation of an adsorber provided in the gas purification device. The installation and removal operation is assumed as unintentional installation and removal operation, for example.

The transmission unit transmits, if presence of installation and removal operation is acquired by the installation and removal operation acquisition unit, the presence of the installation and removal operation to the management server. The management server can determine the presence or absence of unintentional installation and removal operation of the adsorber, for example, find installation of an adsorber that is not an authorized product to thereby prevent the installation of an unauthorized product. Moreover, the respective control devices in the multiple waste disposal facilities (plants) transmit similar information, so that the management server can find the installation of an adsorber that is not an authorized product for each plant, to thereby prevent installation of an unauthorized product.

The control device according to the present embodiment further comprises a determination unit that determines, based on a state of microorganisms that generates ethanol from carbon monoxide gas and hydrogen gas purified by the gas purification device, an activity degree of the microorganisms.

The determination unit determines, based on a state of microorganisms for generating ethanol from carbon monoxide gas and hydrogen gas purified by the gas purification device, an activity degree of the microorganisms. The activity degree includes, for example, a reaction rate, viability or the like of the microorganisms. The activity degree of the microorganisms can be determined by monitoring in real time the state of the microorganisms from outside of a culture solution layer. Note that the activity degree of the microorganisms may be determined by monitoring off-line. Thus, if the activity degree of microorganisms drops, nutrients can be added to thereby activate the microorganisms again. This makes it possible to maintain the generation speed of ethanol at a high level.

A server according to the present embodiment comprises a collection unit that collects, from each of a plurality of waste disposal plants, identification information identifying a plant, gas information on gas converted by a gasifying furnace for converting collected waste to gas, control information controlling the gas purification device for purifying gas converted by the gasifying furnace, and feature information including information on purified gas purified by the gas purification device; and a storage unit that stores the gas information, control information and feature information collected by the collection unit in association with the identification information.

The collection unit collects from each of the plurality of waste disposal plants, identification information identifying a plant, gas information on gas converted by a gasifying furnace for converting collected waste to gas, control information controlling the gas purification device for purifying gas converted by the gasifying furnace, and feature information including information on purified gas purified by the gas purification device.

The storage unit stores the gas information, control information and feature information collected by the collection unit in association with the identification information. This makes it possible to collect and record the information necessary for optimizing the operation of the gas purification device for each plant.

A management server according to the present embodiment comprises a collection unit that collects, from each of a plurality of waste disposal plants, identification information identifying a plant and a degradation level of an adsorber provided in a gas purification device for purifying gas having been converted by a gasifying furnace for converting collected waste to gas; and a storage unit that stores a degradation level collected by the collection unit in association with the identification information.

The collection unit collects, from each of a plurality of waste disposal plants, identification information identifying a plant and a degradation level of an adsorber provided in a gas purification device for purifying gas having been converted by a gasifying furnace for converting collected waste to gas.

The storage unit stores the degradation level collected by the collection unit in association with the identification information. This makes it possible to grasp the degradation level of the adsorber provided in the gas purification device for each plant.

An operation control device according to the present embodiment is an operation control device for controlling a target gas purification device, and comprises: a gas information acquisition unit that acquires gas information on gas converted by a target gasifying furnace for converting collected waste to gas; and a control information output unit that outputs control information for controlling the target gas purification device that is obtained by inputting gas information acquired by the gas information acquisition unit to a learning model trained based on gas information on gas converted by a gasifying furnace, control information controlling a gas purification device for purifying gas converted by the gasifying furnace and feature information including information on purified gas purified by the gas purification device.

An operation control method according to the present embodiment is an operation control method for controlling a target gas purification device, and comprises: acquiring gas information on gas converted by a target gasifying furnace for converting collected waste to gas; and outputting control information for controlling the target gas purification device that is obtained by inputting acquired gas information to a learning model trained based on gas information on gas converted by a gasifying furnace, control information controlling a gas purification device for purifying gas converted by the gasifying furnace and feature information including information on purified gas purified by the gas purification device.

The gas information acquisition unit acquires gas information on gas converted by a target gasifying furnace for converting collected waste to gas. The target gasifying furnace is a furnace capable of steaming and baking waste under low oxygen conditions to break down the waste into the molecular level (including carbon monoxide gas and hydrogen gas, for example). The gas information includes, for example, the concentration of impurity gas (foreign substance) generated by the gasifying furnace. Note that the concentration of the impurity gas fluctuates depending on the component or composition of miscellaneous waste.

The control information output unit outputs control information for controlling the target gas purification device that is obtained by inputting gas information acquired by the gas information acquisition unit to the learning model. It is noted that the operation control device is not provided with a learning model.

The learning model has been trained based on gas information on gas converted by a gasifying furnace (gasifying furnace different from the target gasifying furnace) for converting the collected waste to gas, control information controlling a gas purification device (gas purification device different from the target gas purification device) for purifying gas converted by this gasifying furnace and feature information including information on the purified gas purified by this gas purification device.

The gas information includes, for example, the concentration of impurity gas (foreign substance) generated by this gasifying furnace. Note that the concentration of the impurity gas fluctuates depending on the component or composition of miscellaneous waste. The control information is information for performing operation control of the gas purification device. The feature information includes, for example, purity of carbon monoxide gas and hydrogen gas, purity or quantity of ethanol, an activity degree of a catalyst (microorganisms, for example) for generating ethanol from carbon monoxide gas and hydrogen gas, and the purity or quantity of the generated ethylene.

The learning model may be trained by using, for example, deep learning, reinforcement learning, deep reinforcement learning, or the like.

According to the above-described configuration, even if not provided with a learning model, the operation control device can provide a learning model with the gas information acquired by the gas information acquisition unit, and can control the operation of the target gas purification device based on the control information obtained from this learning model.

The operation control device according to the present embodiment further comprises a transmission unit that transmits gas information acquired by the gas information acquisition unit to a server provided with a learning model trained based on gas information on gas converted by a gasifying furnace, control information for controlling a gas purification device for purifying gas converted by the gasifying furnace and feature information including information on purified gas purified by the gas purification device; and a reception unit that receives control information controlling a gas purification device transmitted by the server, and a control information output unit outputs control information received by the reception unit to the target gas purification device.

The transmission unit transmits gas information acquired by the gas information acquisition unit to the server. The server is provided with a learning model. The learning model has been trained based on gas information converted by a gasifying furnace, control information controlling a gas purification device for purifying the gas converted by the gasifying furnace and feature information including information on the purified gas purified by the gas purification device.

The reception unit receives control information for controlling the gas purification device transmitted by the server. The control information output unit outputs the control information received by the reception unit to the target gas purification device.

In the above described configuration, even if not provided with a learning model, the operation control device can transmit the gas information acquired by the gas information acquisition unit to the server provided with a learning model, receive control information transmitted from the server, and control the operation of the gas purification device based on the received control information. Thus, the operation control device can control the operation of the target gas purification device by using the learning model provided in the server connected thereto through a network such as the Internet or the like. This enables operation control of the target gas purification device even if the server and the operation control device are established in different countries or regions, for example.

It is noted that in the present embodiment, an organic compound and/or an inorganic compound may be used as an alternative to the waste. In this case, a control device can comprise: a gas information acquisition unit that acquires gas information on gas converted by a gasifying furnace for converting an organic compound and/or an inorganic compound to gas; a control information acquisition unit that acquires control information controlling a gas purification device for purifying gas converted by the gasifying furnace; a feature information acquisition unit that acquires feature information including information on purified gas purified by the gas purification device; and a creation unit that creates a learning model by machine learning based on the gas information, the control information and the feature information. The control device can further comprise: a learning model trained based on gas information on gas converted by the gasifying furnace for converting an organic compound and/or an inorganic compound to gas, control information controlling the gas purification device for purifying gas converted by the gasifying furnace, and feature information including information on purified gas purified by the gas purification device; a gas information acquisition unit that acquires gas information on gas converted by the gasifying furnace; and an output unit that inputs gas information acquired by the gas information acquisition unit to the learning model to output control information for controlling the gas purification device.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control device controlling a gas purification device, comprising:
   a gas information acquisition unit that acquires gas information on gas converted by a gasifying furnace for converting collected waste to gas;
   a control information acquisition unit that acquires control information controlling the gas purification device for purifying gas converted by the gasifying furnace;
   a feature information acquisition unit that acquires feature information including information on purified gas purified by the gas purification device;
   a creation unit that creates a learning model by machine learning based on the gas information, the control information and the feature information;
   a use history acquisition unit that acquires a use history of an adsorber provided in the gas purification device;
   a transmission unit that transmits a use history acquired by the use history acquisition unit to a management server; and
   a degradation level acquisition unit that acquires a degradation level of an adsorber provided in the gas purification device, wherein
   the transmission unit transmits a degradation level acquired by the degradation level acquisition unit to the management server.

2. A control device controlling a gas purification device, comprising:
   a gas information acquisition unit that acquires gas information on gas converted by a gasifying furnace for converting collected waste to gas;
   a control information acquisition unit that acquires control information controlling the gas purification device for purifying gas converted by the gasifying furnace;
   a feature information acquisition unit that acquires feature information including information on purified gas purified by the gas purification device;
   a creation unit that creates a learning model by machine learning based on the gas information, the control information and the feature information;

a use history acquisition unit that acquires a use history of an adsorber provided in the gas purification device;

a transmission unit that transmits a use history acquired by the use history acquisition unit to a management server; and an installation and removal operation acquisition unit that acquires a presence or absence of installation and removal operation of an adsorber provided in the gas purification device, wherein the transmission unit transmits, if presence of installation and removal operation is acquired by the installation and removal operation acquisition unit, the presence of the installation and removal operation to the management server.

3. A control device controlling a gas purification device, comprising:

a gas information acquisition unit that acquires gas information on gas converted by a gasifying furnace for converting collected waste to gas;

a control information acquisition unit that acquires control information controlling the gas purification device for purifying gas converted by the gasifying furnace;

a feature information acquisition unit that acquires feature information including information on purified gas purified by the gas purification device;

a creation unit that creates a learning model by machine learning based on the gas information, the control information and the feature information; and a determination unit that determines, based on a state of microorganisms for generating ethanol from carbon monoxide gas and hydrogen gas purified by the gas purification device, an activity degree of the microorganisms.

* * * * *